(12) United States Patent
Wagner et al.

(10) Patent No.: US 9,809,952 B2
(45) Date of Patent: Nov. 7, 2017

(54) SYSTEM AND METHOD FOR DEWATERING SLURRIES

(71) Applicant: Liquid Waste Technology, LLC, New Richmond, WI (US)

(72) Inventors: Dustin Dana Wagner, Ellendale, ND (US); Terrell Kevin Dunn, Ellendale, ND (US); Ryan Patrick Horton, Leawood, KS (US)

(73) Assignee: Liquid Waste Technology, LLC, New Richmond, WI (US)

( * ) Notice: Subject to any disclaimer, the term of this patent is extended or adjusted under 35 U.S.C. 154(b) by 91 days.

(21) Appl. No.: 15/145,133

(22) Filed: May 3, 2016

(65) Prior Publication Data

US 2016/0326715 A1    Nov. 10, 2016

Related U.S. Application Data

(60) Provisional application No. 62/157,244, filed on May 5, 2015.

(51) Int. Cl.
*E02F 7/00* (2006.01)
*C02F 11/12* (2006.01)
(Continued)

(52) U.S. Cl.
CPC ............ *E02F 7/00* (2013.01); *B01D 21/0012* (2013.01); *B01D 21/2444* (2013.01);
(Continued)

(58) Field of Classification Search
CPC ... E02F 7/00; B01D 21/0012; B01D 21/2444; B01D 23/02; B01D 23/04; B01D 29/23;
(Continued)

(56) References Cited

U.S. PATENT DOCUMENTS 4,807,373 A * 2/1989 Sloan .................. E02F 3/88
                                                   210/170.04
5,536,420 A * 7/1996 Oyzboyd ............. C02F 11/16
                                                      210/804

(Continued)

FOREIGN PATENT DOCUMENTS

| JP | 5520625 S | 2/1980 |
| KR | 20120097881 A | 9/2012 |
| NL | 2010129 | 7/2013 |

OTHER PUBLICATIONS

Photo posted by MudMen Dredging, Inc. to Facebook on Jun. 23, 2013, www.facebook.com/MudmenDredgingInc/photos/a.155489584637763.1073741825.155488527971202/157771317742923/?type=3&theater.

(Continued)

*Primary Examiner* — Christopher Upton
(74) *Attorney, Agent, or Firm* — Hovey Williams LLP

(57) ABSTRACT

A dewatering system for separating a slurry into solid material and effluent water. The dewatering system comprises a plurality of support frames arranged to enclose an interior space of the dewatering system, with the interior space being configured to receive the slurry. The dewatering system further includes geo-fabric material positioned on a portion of the support frames, with the geo-fabric material being configured to filter the slurry received within the interior space, such that effluent water permeates through the geo-fabric material and is discharged from the interior space. The dewatering system further comprises a dump door assembly associated with at least one of the support frames, with the dump door assembly including a plurality of hatches configured to selectively open to allow effluent water to be discharged from the interior space of the dewatering system.

20 Claims, 29 Drawing Sheets

(51) Int. Cl.
 B01D 21/24 (2006.01)
 B01D 29/00 (2006.01)
 B01D 29/23 (2006.01)
 B01D 21/00 (2006.01)
 C02F 1/00 (2006.01)
 C02F 11/16 (2006.01)
 C02F 103/10 (2006.01)

(52) U.S. Cl.
 CPC .............. B01D 23/02 (2013.01); B01D 29/23 (2013.01); C02F 1/004 (2013.01); C02F 11/12 (2013.01); C02F 11/128 (2013.01); C02F 11/16 (2013.01); *C02F 2001/007* (2013.01); *C02F 2103/10* (2013.01); *C02F 2307/00* (2013.01)

(58) Field of Classification Search
 CPC ........ C02F 1/004; C02F 11/12; C02F 11/128; C02F 11/16; C02F 2001/007
 USPC ........ 210/747.1, 747.4, 170.01, 170.04, 299, 210/540; 37/307
 See application file for complete search history.

(56) References Cited

U.S. PATENT DOCUMENTS

| | | | | |
|---|---|---|---|---|
| 5,589,081 | A * | 12/1996 | Harris | .................... B01D 29/23 210/804 |
| 6,146,453 | A | 11/2000 | Nigro | |
| 2003/0062319 | A1* | 4/2003 | Keller | .................... B01D 29/27 210/170.04 |
| 2004/0112837 | A1* | 6/2004 | Stephens | ............... C02F 11/128 210/170.09 |
| 2007/0181197 | A1 | 8/2007 | Krichten et al. | |

OTHER PUBLICATIONS

Photo posted by MudMen Dredging, Inc. to Facebook on Jul. 17, 2013, www.facebook.com/MudmenDredgingInc/photos/a. 157440464442675.1073741826.155488527971202/ 160295640823824/?type=3&theater.

Photo posted by MudMen Dredging, Inc. to Facebook on Oct. 12, 2013, www.facebook.com/MudmenDredgingInc/photos/a. 157440464442675.1073741826.155488527971202/ 186877778165610/?type=3&theater.

Photo posted by MudMen Dredging, Inc. to Facebook on Jul. 7, 2013, www.facebook.com/MudmenDredgingInc/photos/a. 157786811074707.1073741830.155488527971202/ 157786824408039/?type=3&theater.

Photo posted by MudMen Dredging, Inc. to Facebook on Jul. 7, 2013, www.facebook.com/MudmenDredgingInc/photos a.155489584637763.1073741825.155488527971202/ 157771741076214/?type=3&theater.

Still image of video entitled "Mudflow into Containment 1" uploaded by MudMen Dredging, Inc. to Facebook on Jul. 11, 2013, www.facebook.com/MudmenDredgingInc/videos/ 10201602348250866/.

Still image of video uploaded by MudMen Dredging, Inc. to Facebook on Oct. 12, 2013, www.facebook.com/ MudmenDredgingInc/videos.

European Search Report dated Aug. 3, 2016 received in connection with European Patent Application No. EP1602172, 9 pages.

* cited by examiner

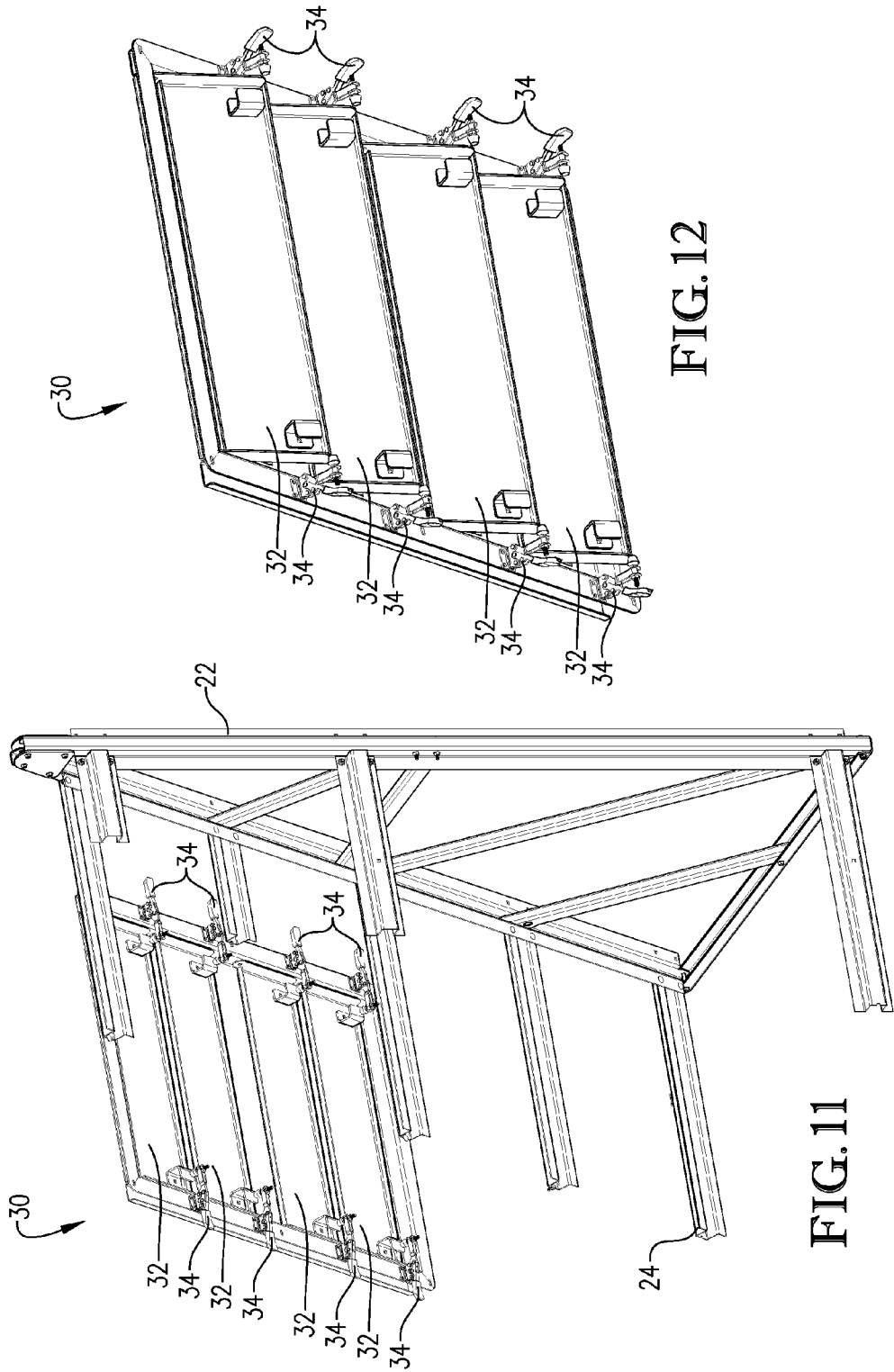

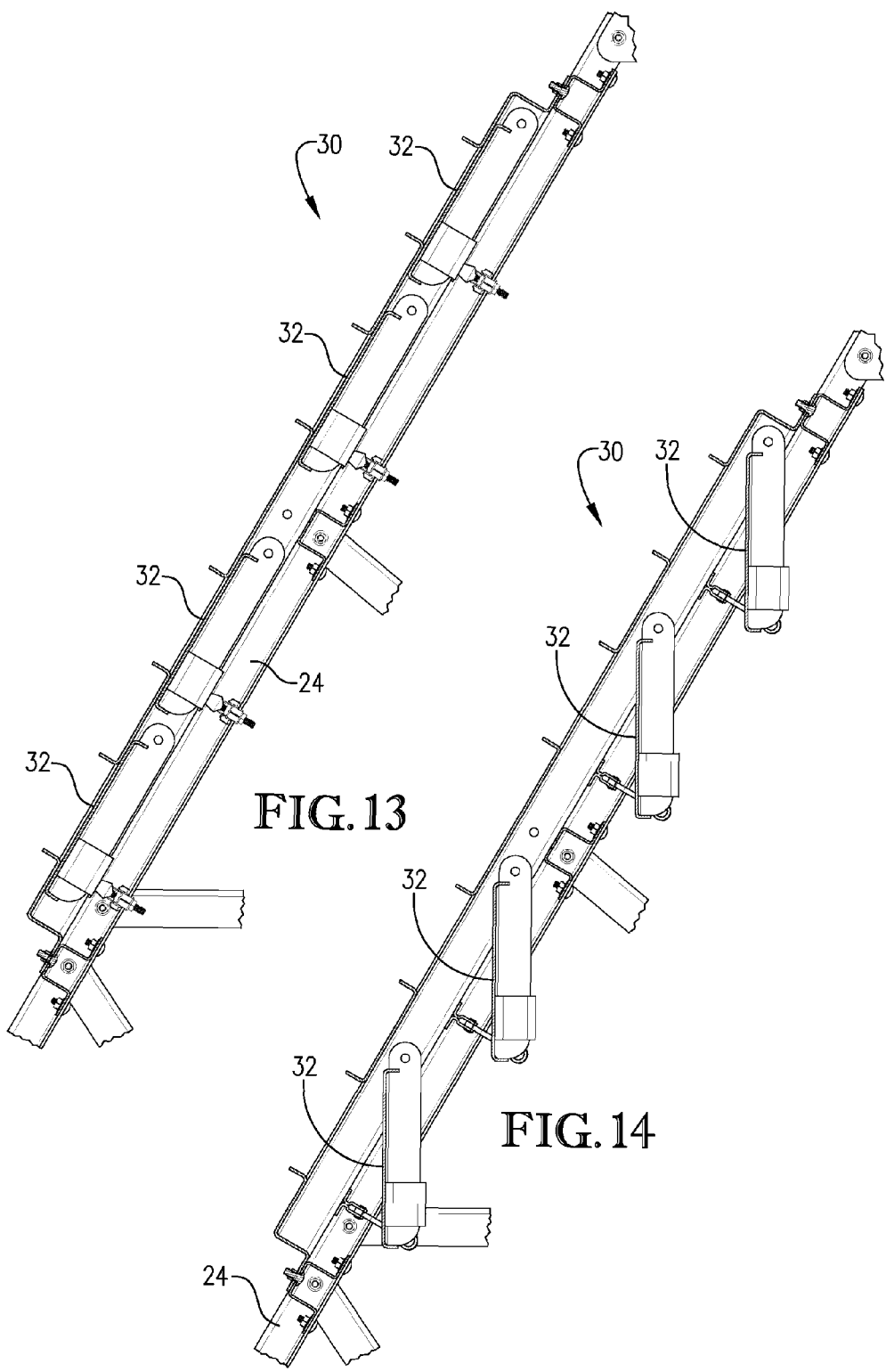

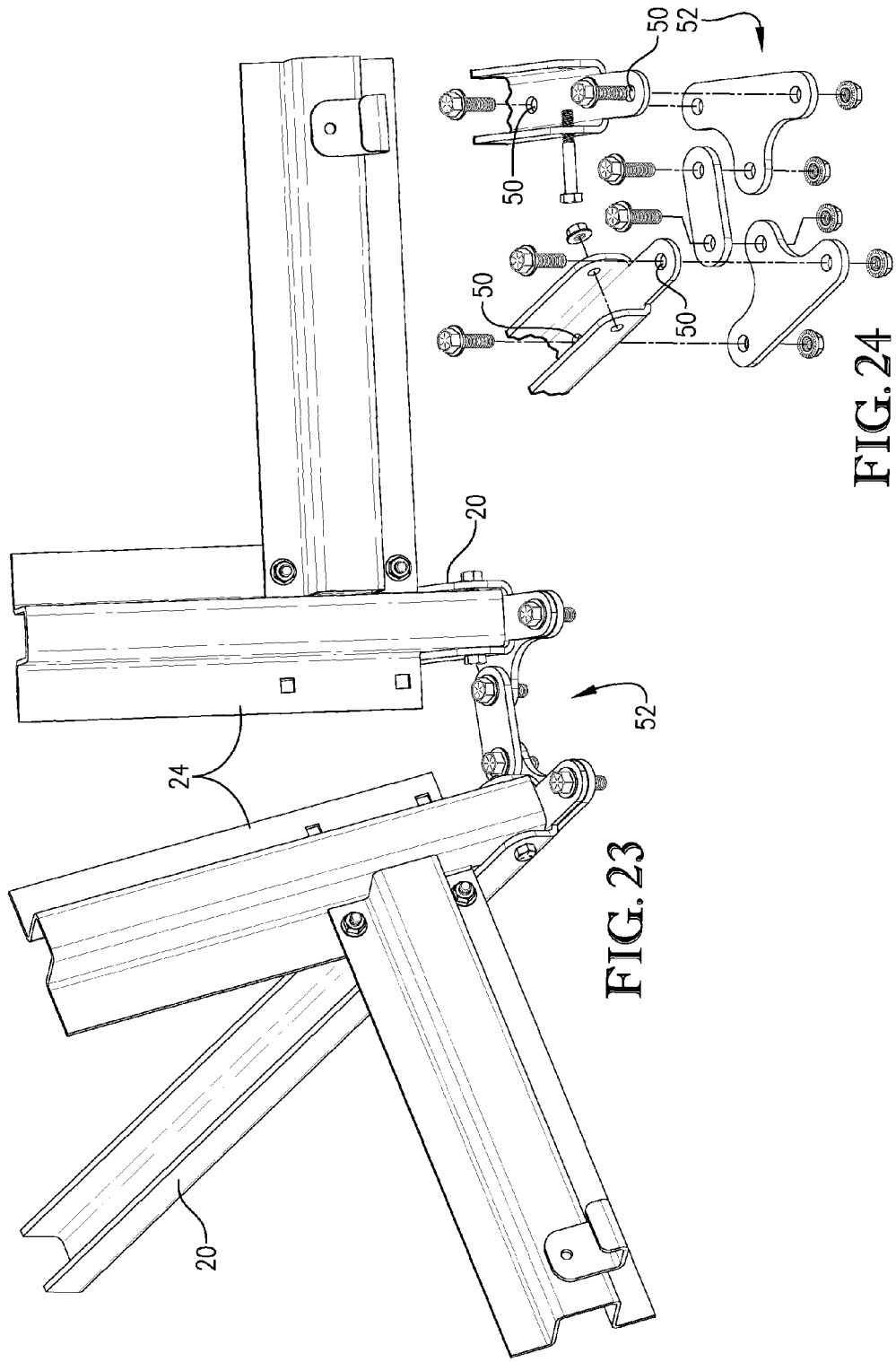

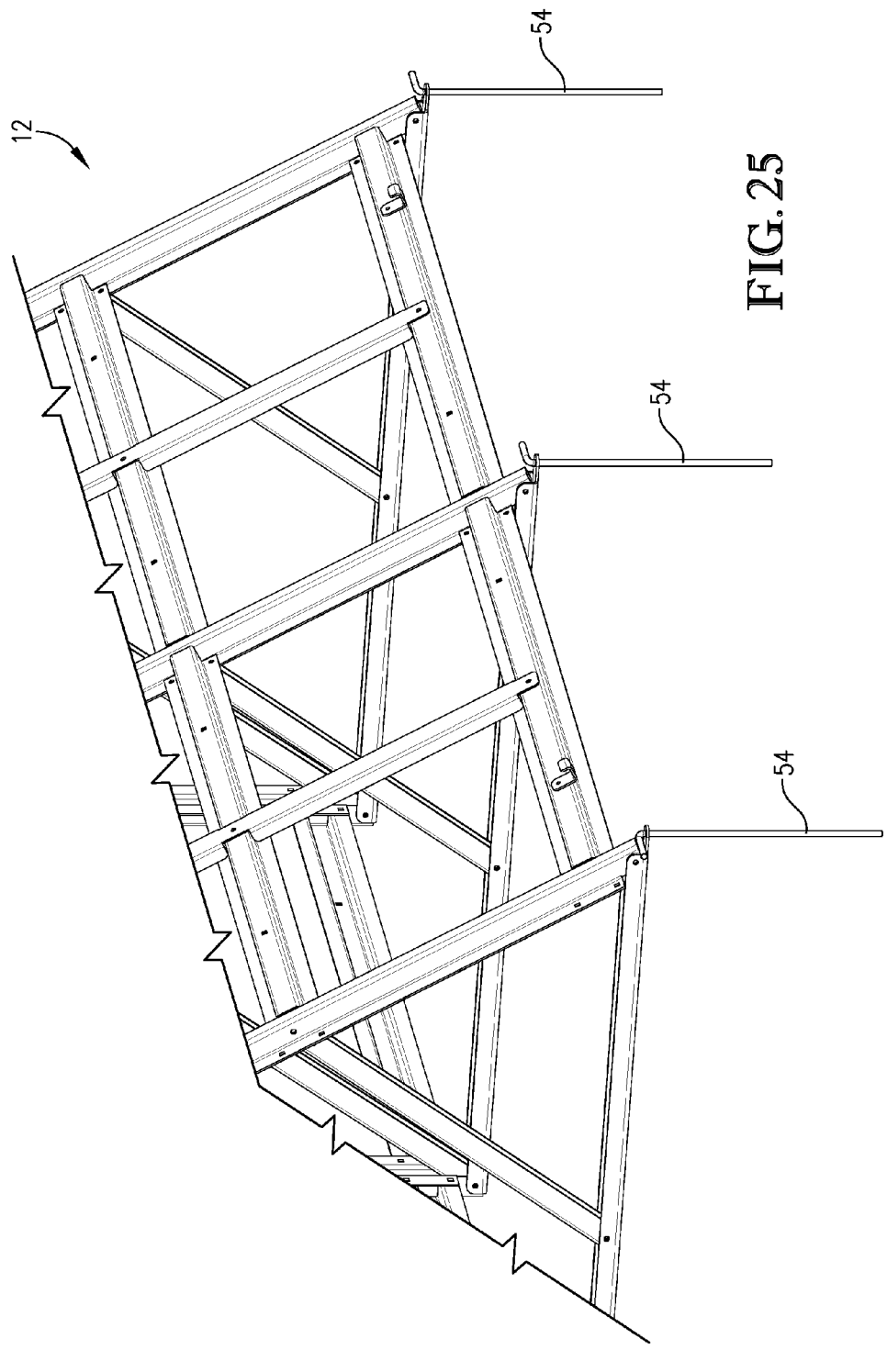

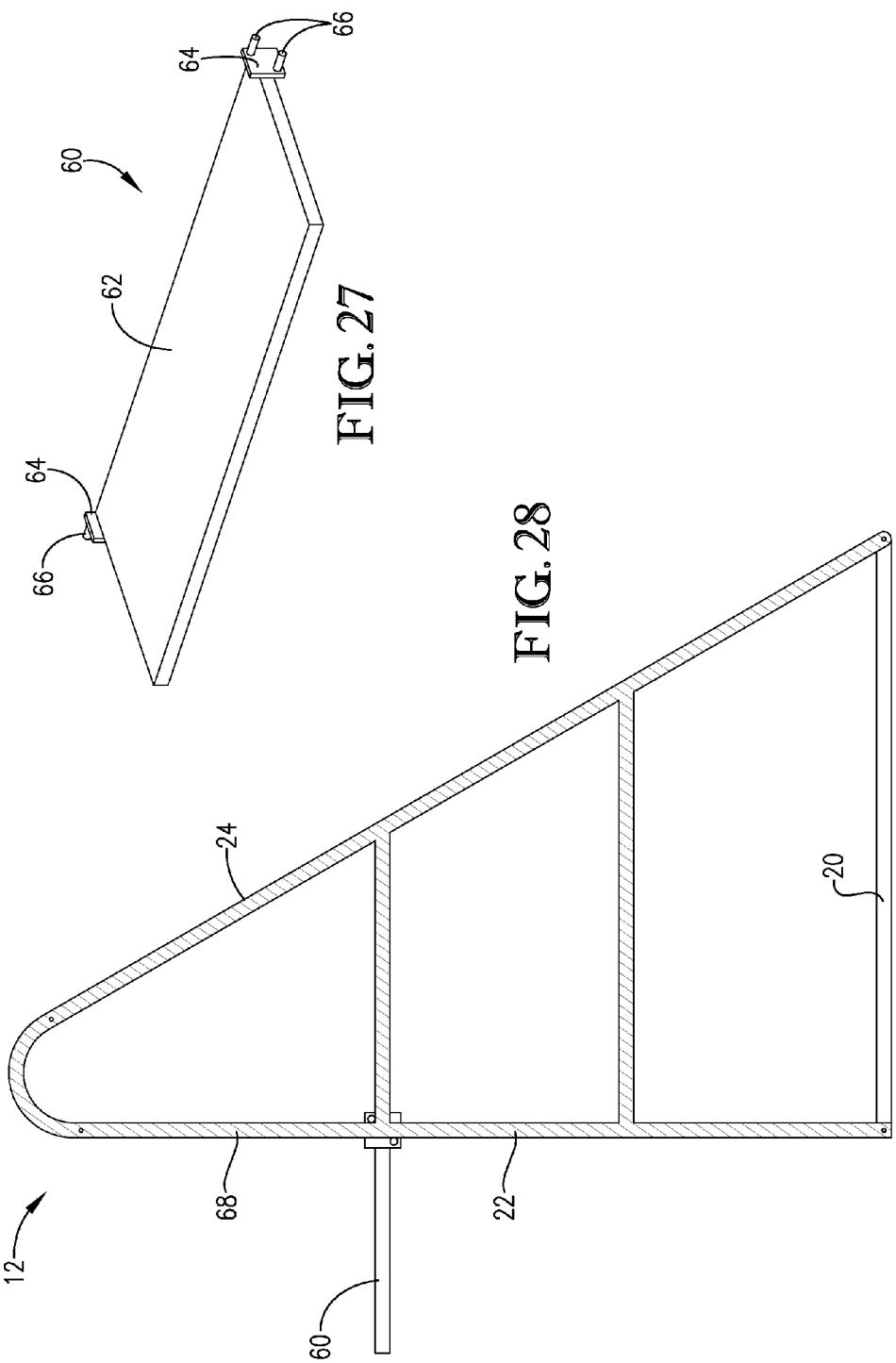

SYSTEM AND METHOD FOR DEWATERING SLURRIES

CROSS-REFERENCE TO RELATED APPLICATION

This non-provisional patent application claims priority to U.S. Provisional Patent Application Ser. No. 62/157,244, filed on May 5, 2015, entitled "SYSTEM AND METHOD FOR DEWATERING SLURRIES," the entirety of which is incorporated by reference into the present non-provisional patent application.

BACKGROUND OF THE INVENTION

1. Field of the Invention

Embodiments of the present invention are directed to a system and a method for dewatering slurries. In more detail, embodiments of the present invention are directed to a customizable dewatering system that can be efficiently erected to perform dewatering operations for slurries obtained from dredging or from other waste removal operations.

2. Description of the Related Art

Dewatering is one of the biggest obstacles facing dredging operations around the globe. Previously, common dredge discharge areas were constructed by hauling in dirt and constructing an earthen-wall containment cell to decant dredged materials (hereinafter referred to as "slurry" or "slurries") that have been dredged from a body of water. The silt, sand, or sediment (hereinafter referred to as "solid material") in the slurry would settle to the bottom of the containment cell, and the resulting clarified water (forming on top of the settled, solid material) could be decanted at the appropriate time through a weir-box release system or decanting pipe. However, this is a time consuming and expensive process.

Another previously-used form of dewatering slurries is through the use of containers comprised of synthetic-woven fabric formed into a tube. A dredge discharge pipe or hose can be connected to ports on top of the tube, and the tube can be filled with the slurry. The solid material from the slurry settles in the tube and clarified water filters through the fabric. However, this process usually requires dozens of tubes to be filled in parallel using a manifold that diverts the flow of the slurry through a series of knife valves. Polymers can be added to increase the dewatering rate and to settle out solid material faster. Nevertheless, polymers are expensive and usually require an auto-injector system which calibrates the right quantity of polymer to match the charge of the solid material (or, alternatively, an onsite chemist may be required to perform this work manually). Such synthetic-woven fabric tubes are a common method for dewatering slurries, but they are expensive and are not re-usable.

Another previously-used dewatering process includes the use of mechanical dewatering systems that are road transportable and contain a series of de-sanders, de-silters, and hydro-cyclones. These systems can match the slurry feed of a dredging system and are scalable. Furthermore, these systems can be used to dewater slurries down to 25 microns. Nevertheless, they require additional clarifying technologies to remove smaller particles (usually fine organics under 25 microns) from clarified water. However, these systems are quite complex and expensive. For instance, the cost for such a complete mechanical dewatering system can range from between $500,000 to $4,000,000.

As such, there is a need for a dewatering system with a reduced complexity, which allows the dewatering system to be erected in an efficient manner, with a small footprint, and at generally any location as may be necessitated by dredging operations. Additionally, there is a need for a dewatering system that can be manufactured at a reasonable price to accommodate its use for dredging operations performed throughout the world, such as in third-world countries that may not have the financial resources to obtain other, high-priced dewatering systems (e.g., the mechanical dewatering system described above).

SUMMARY

Embodiments of the present invention include a dewatering system for separating a slurry into solid material and effluent water. The dewatering system comprises a plurality of support frames arranged to enclose an interior space of the dewatering system, with the interior space being configured to receive the slurry. The dewatering system further includes geo-fabric material positioned on a portion of the support frames, with the geo-fabric material being configured to filter the slurry received within the interior space, such that effluent water permeates through the geo-fabric material and is discharged from the interior space. The dewatering system further comprises a dump door assembly associated with at least one of the support frames, with the dump door assembly including a plurality of hatches configured to selectively open to allow effluent water to be discharged from the interior space of the dewatering system.

Embodiments of the present invention additionally include an additional dewatering system for separating a slurry into solid material and effluent water. The dewatering system comprises a plurality of support frames arranged to enclose an interior space of the dewatering system, with the interior space being configured to receive the slurry. The dewatering system additionally comprises geo-fabric material positioned on a portion of the support frames, with the geo-fabric material being configured to filter the slurry received within the interior space, such that effluent water permeates through the geo-fabric material and is discharged from the interior space. Two adjacent support frames from the plurality of support frames may present a gate assembly, with each of the support frames of the gate assembly including at least one wheel on a base of the support frame. As such, the wheels allow the support frames to rotate open to provide access to the interior space of the dewatering system.

Embodiments of the present invention further include a method of dewatering a slurry dredged from a source of water, with the slurry being dewatered to form a solid material and effluent water. The method comprises an initial step of providing a dewatering system that includes a plurality of support frames arranged to enclose an interior space of the dewatering system, geo-fabric material positioned on a portion of the support frames, and a dump door assembly associated with at least one of the support frames, with the dump door assembly comprising a plurality of hatches. The method includes the additional step of adding a slurry to the interior space of the dewatering system. The method includes the further step of separating the slurry into solid material and effluent water. During said separating step, the solid material settles to a bottom of the interior space of the dewatering system, and the effluent water is discharged from the dewatering system by being filtered through the geo-fabric material and by passing through an open hatch of the dump door assembly.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 11 is an exterior side perspective partial view of the support frame and dump door assembly from FIGS. 9-10;

FIG. 12 is an exterior side perspective view of a portion of the dump door assembly from FIGS. 9-11, with the hatches of the dump door assembly in an open position;

FIG. 13 is a cross-section view of a portion of the support frame and the dump door assembly from FIG. 9, with the hatches in the closed position;

FIG. 14 is a cross-section view of the portion of the support frame and the dump door assembly from FIG. 13, with the hatches in the open position;

FIG. 23 is a perspective view of a connection between the support frames of FIG. 6, particularly illustrating the connection being formed by a bracket assembly;

FIG. 24 is an exploded view of the bracket assembly and a portions of the support frames from FIG. 23;

FIG. 25 is a perspective partial view of a support frame according to embodiments of the present invention, particularly illustrating a plurality of anchors for securing the support frame with the ground;

FIG. 27 is a perspective view of one of the work platforms from FIG. 26;

FIG. 28 is a cross-section view of the support frame from FIG. 26, particularly illustrating one of the work platforms secured to the exterior side of the support frame;

Figure 35:
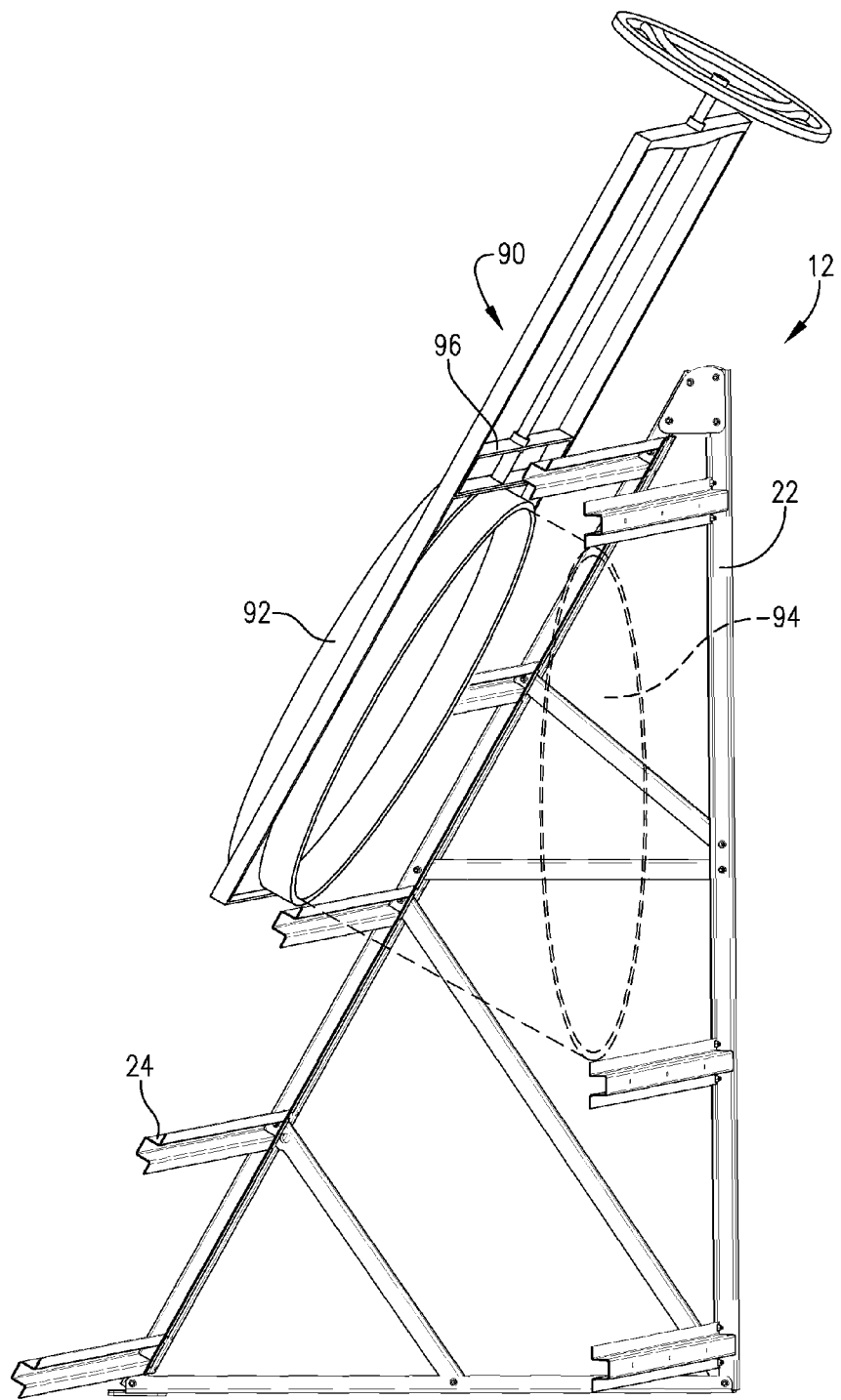
Figure 36:
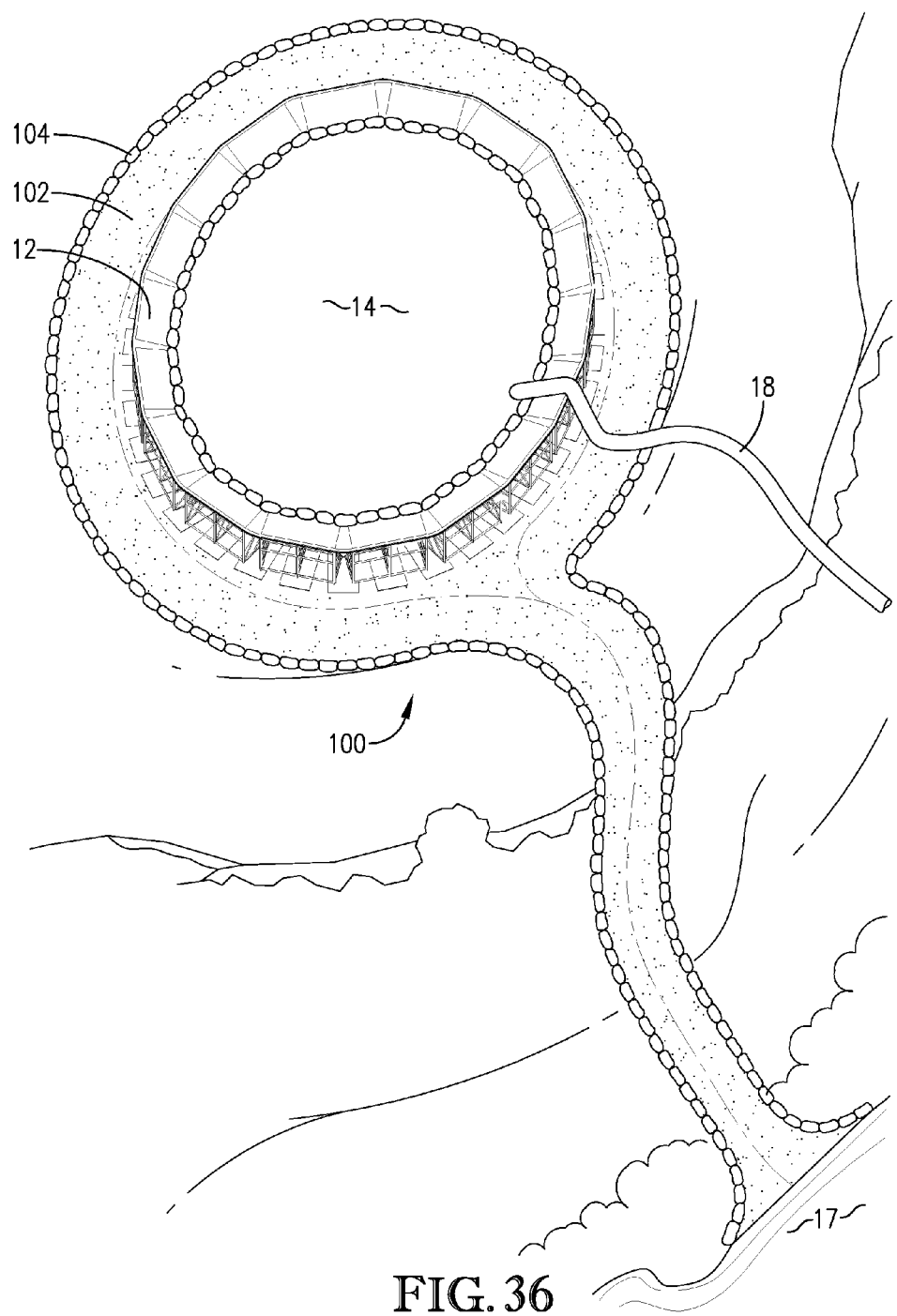

FIG. 35 is a perspective partial view of a support frame according to embodiments of the present invention, particularly illustrating a gate valve assembly integrated with an interior side of the support frame; and FIG. 36 is an illustration of a dewatering system according to embodiments of the present invention, with the dewatering system including a portable skirting system for collecting effluent water discharged from an interior space of the dewatering system and for directing the effluent water back to a body of water.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
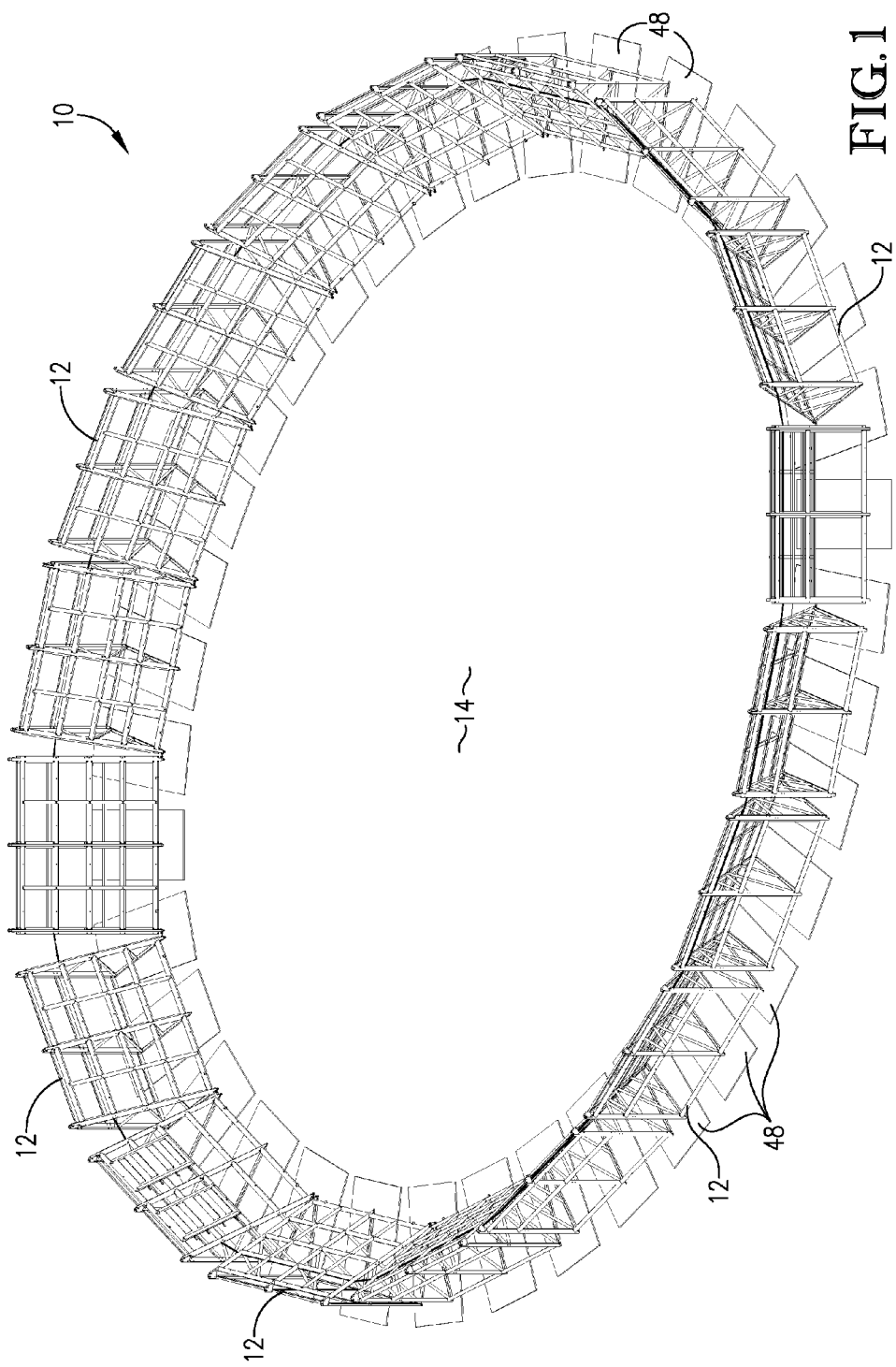
FIG. 1 is a perspective view of a dewatering system according to embodiments of the present invention, particularly illustrating a plurality of support frames arranged to enclose an interior space.
Figure 2:
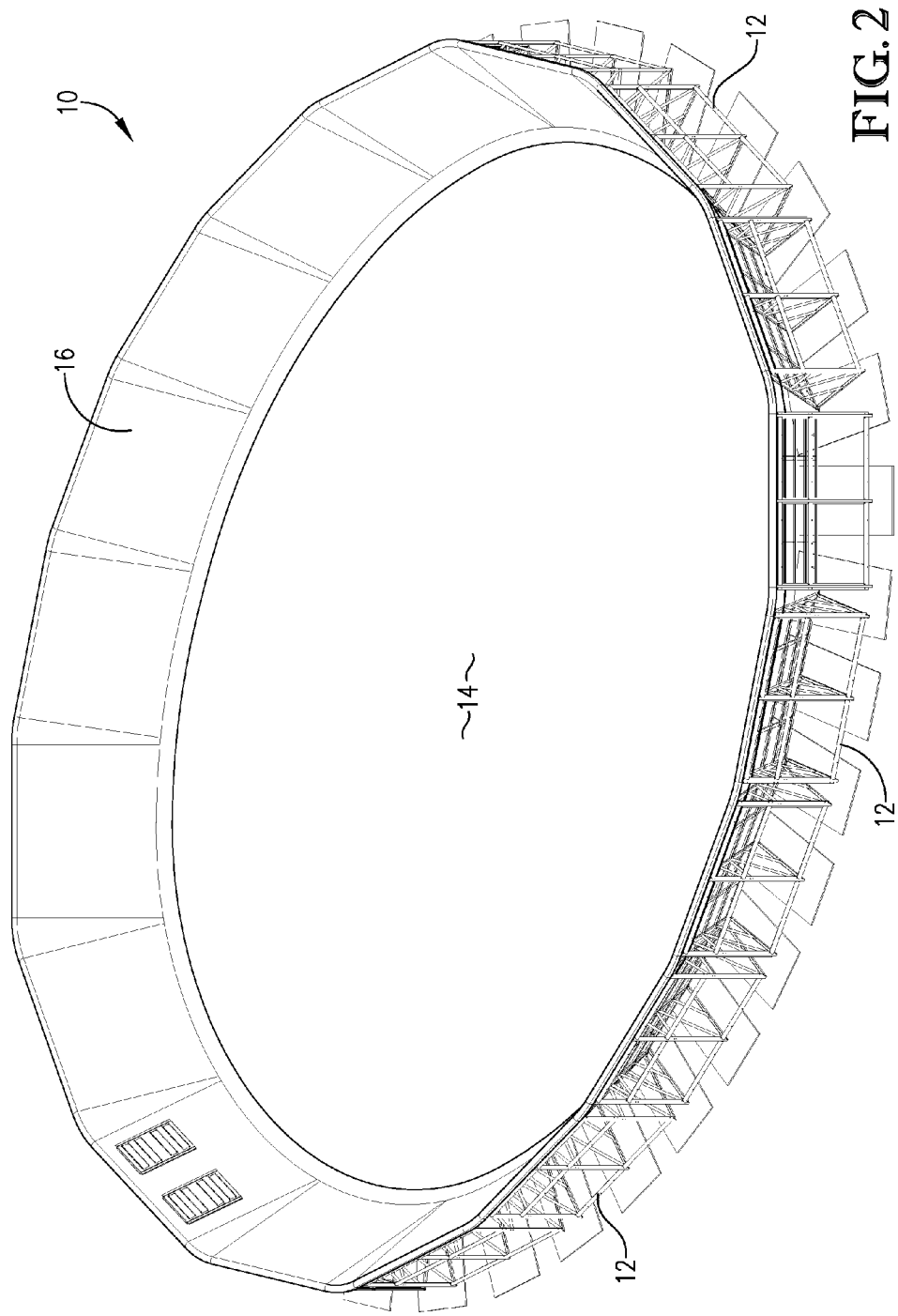
FIG. 2 is a perspective view of the dewatering system of FIG. 1, with the dewatering system further including a geo-fabric material positioned on the support frames.
Figure 3:
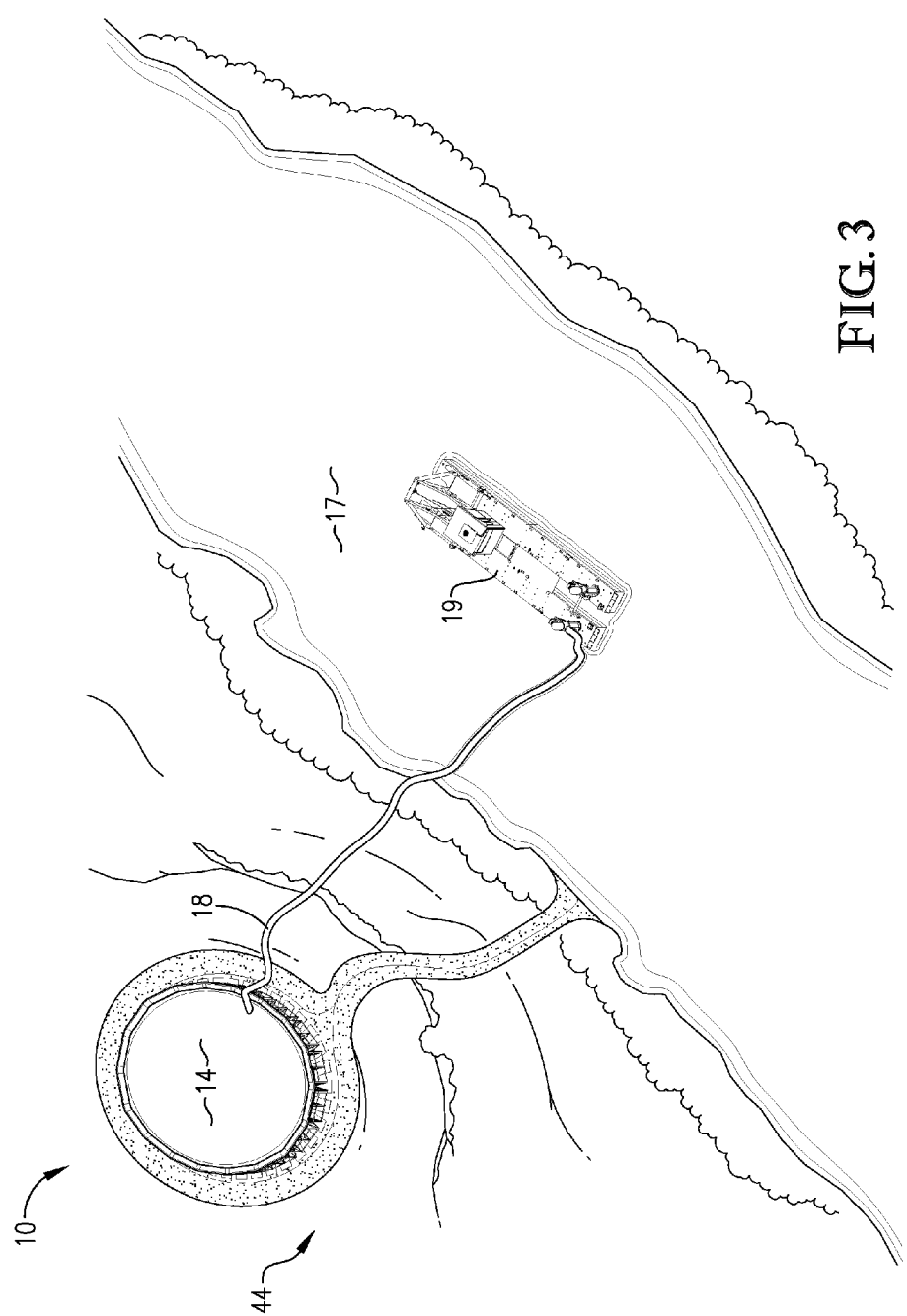
FIG. 3 is an illustration of a dewatering system being used to dewater a slurry obtained by a dredging vessel from a body of water.
Figure 4:
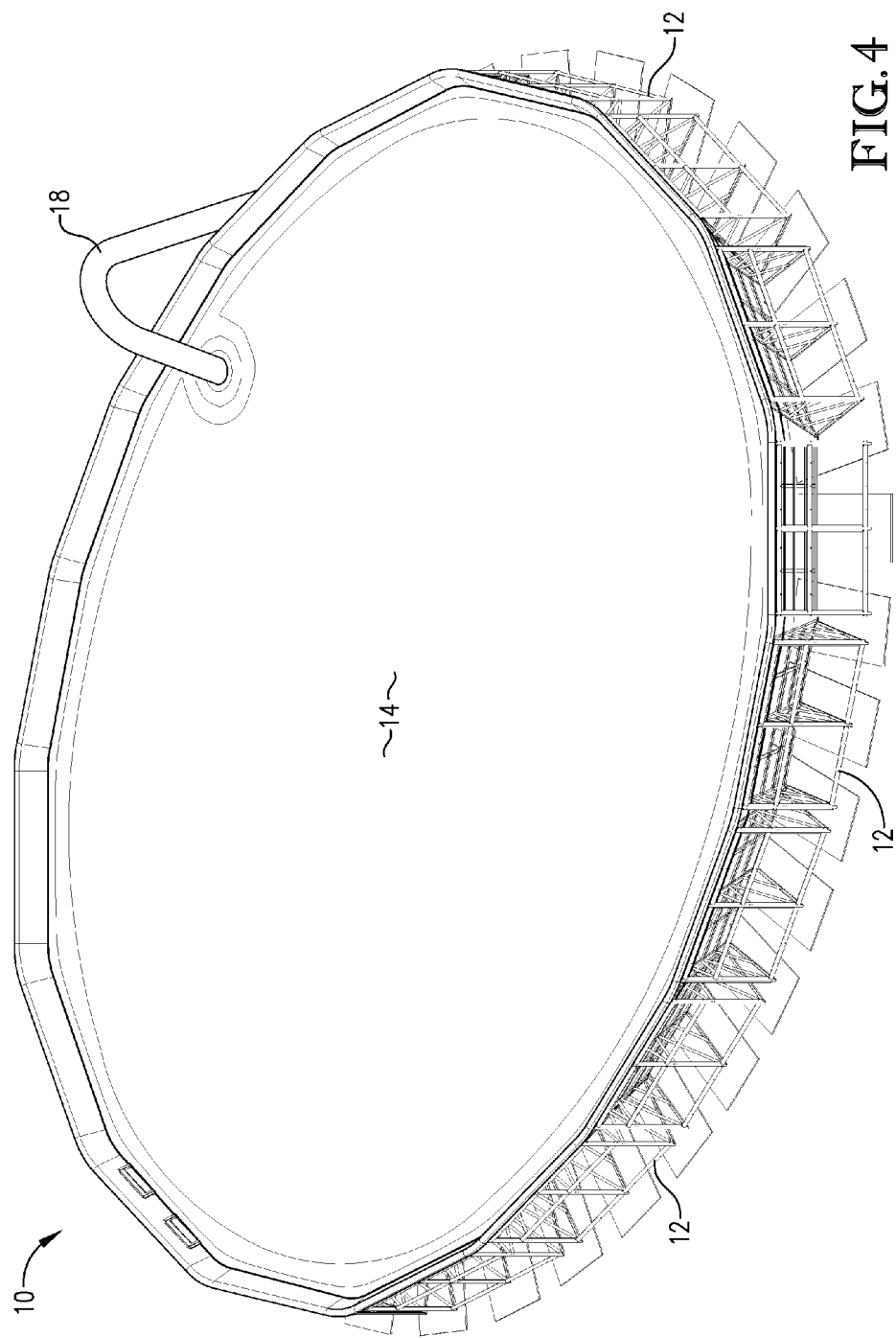
FIG. 4 is a perspective view of the dewatering system of FIG. 2 being filled with a slurry.
Figure 5:
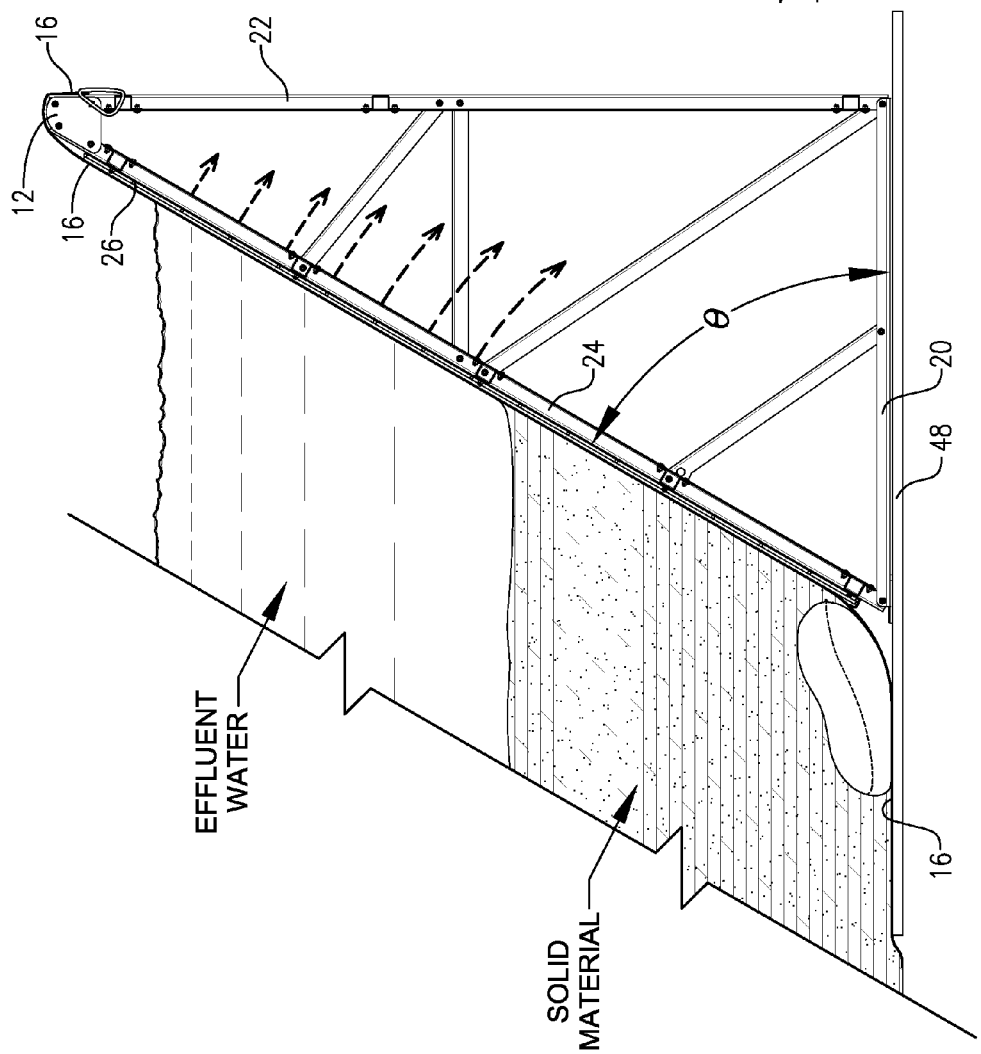
FIG. 5 is a cross-section of a support frame and a portion of the interior space from the dewatering system of FIG. 4, particularly illustrating the slurry separating into solid material and effluent water, and with effluent water filtering through the geo-fabric material positioned on the support frame so as to be discharged from the dewatering system.

With reference to the figures, and particularly FIG. 1, embodiments of the present invention comprise a dewatering system 10 that may include a plurality of support frames 12 arranged in a closed shape so as to bound an interior space 14. As illustrated in FIG. 2, the dewatering system 10 may additionally comprise a geo-fabric material 16 secured on the support frames 12 and extending about at least a portion of the interior space 14 bounded by the support frames 12. As such, as illustrated in FIGS. 3 and 4, a slurry that has been dredged from a body of water 17 can be pumped into the interior space 14 of the dewatering system 10, such as via a discharge pipe 18 connected to a dredging vessel 19 operating on the body of water 17. As illustrated in FIG. 5, embodiments provide for solid material (e.g., silt, sand, or sediment) in the slurry to settle toward the bottom of the dewatering system 10, while clarified or effluent water forming on top of the settled, solid material can, under the force of gravity, be filtered through the geo-fabric material 16 and the support frames 12. The resulting effluent water may, in some embodiments, exit the dewatering system 10 and be re-routed back to the body of water 17, as illustrated in FIG. 3. As such, the dewatering system 10 of embodiments of the present invention can efficiently dewater slurries at a fraction of the cost of previously-used systems and without the use chemicals. Furthermore, as will be described in more detail below, the dewatering system 10 is scalable, re-usable, and efficient to transport, set-up, and tear down.

Figure 6:
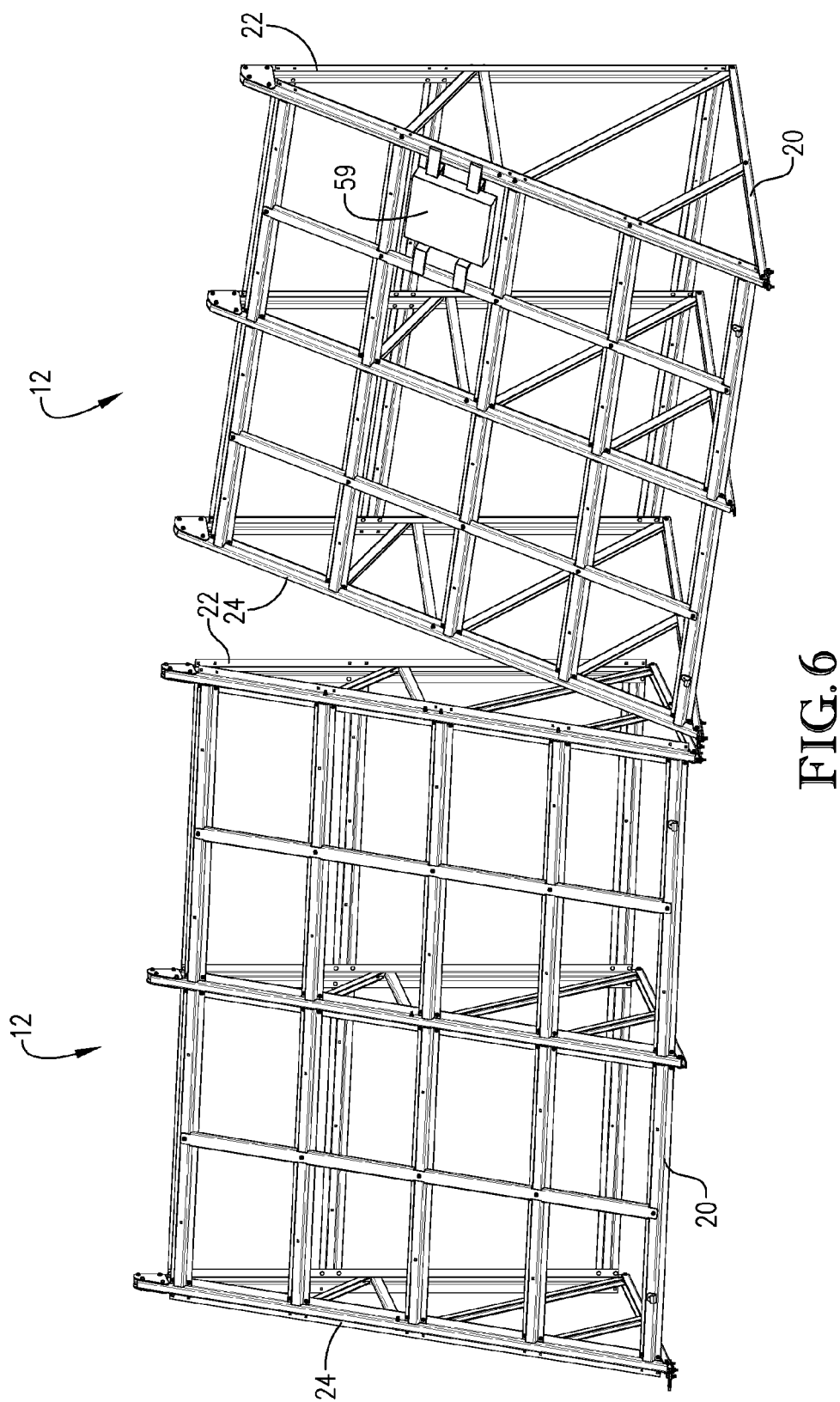
FIG. 6 is an interior side perspective view of a pair of support frames according to embodiments of the present invention.
Figure 7:
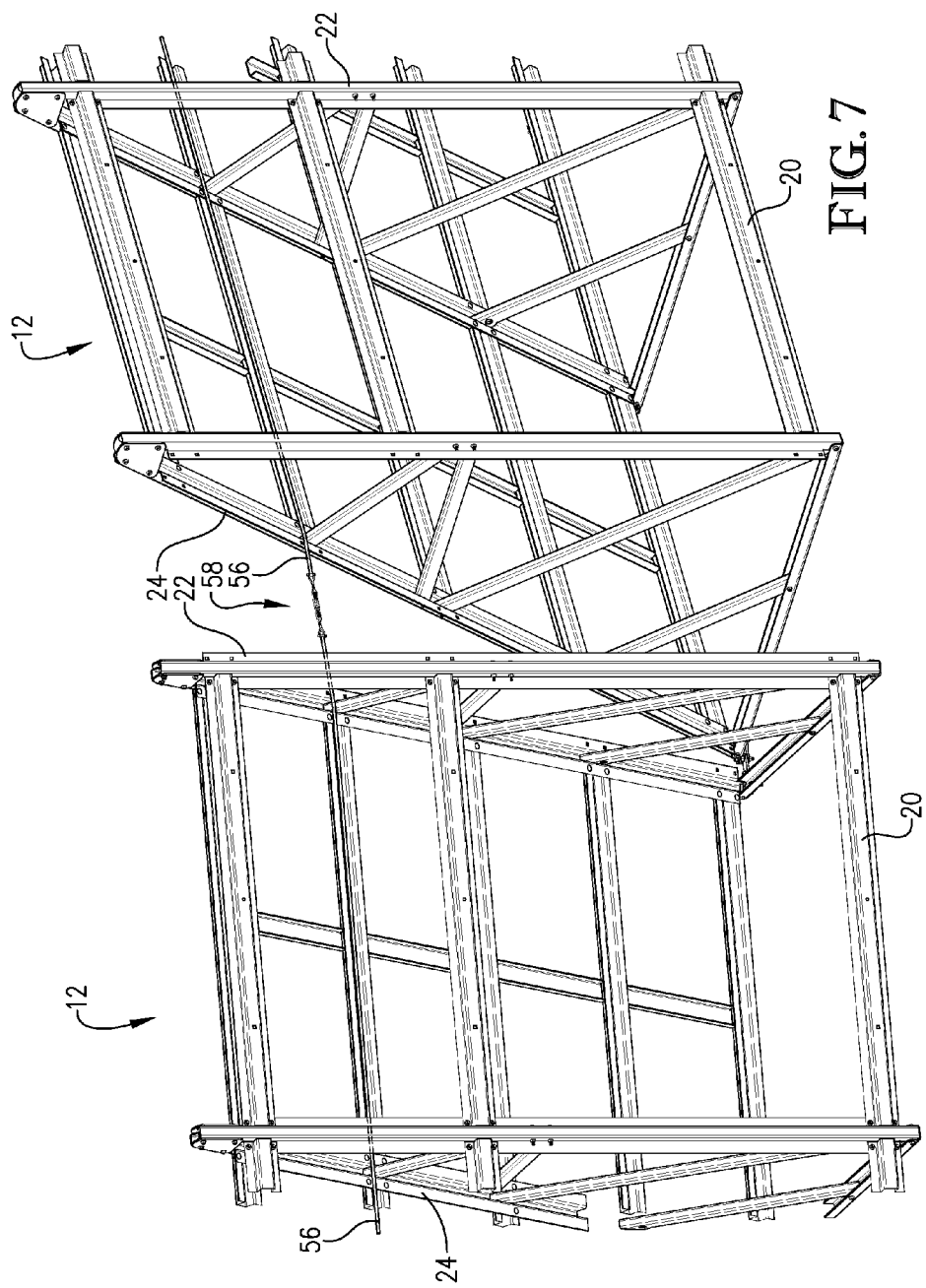
FIG. 7 is an exterior side perspective partial view of a pair of support frames according to embodiments of the present invention, particularly illustrating a safety cable securing the support frames together.

In more detail, as illustrated in FIGS. 6 and 7, the support frames 12 of the dewatering system 10 may be generally formed in the shape of an A-frame, with a base 20, an exterior side 22, and an interior side 24. The base 20, the exterior side 22, and the interior side 24 may be formed from various material components that have sufficient strength and durability to provide support for the dewatering system 10 during dewatering operations. Such components may comprise extended rods, plates, or tubing (e.g., circular or square), which may be formed from steel, aluminum, or other metals, or composite materials, or the like or combinations thereof. Embodiments of the present invention also provide for the support frames 12 to be formed in a modular design to allow for more efficient transportation to, as well as assembly and dis-assembly at, dewatering sites. For example, in some embodiments, each of the base 20, the exterior side 22, and the interior side 24 may be configured to be efficiently assembled together and dis-assembled from each other. For instance, the base 20, the exterior side 22, and the interior side 24 may be assembled and secured together via standard hand-tool fasteners, such as nut and bolt combinations, screws, and the like. In additional embodiments, other individual components of the base 20, the exterior side 22, and the interior side 24 may all be configured to be individually assembled and disassembled as well (e.g., via nut and bolt combinations, screws, and the like). In addition to assembly and disassembly, such a modular design may allow for repairs to support frames 12 to be carried out in place, at dewatering sites. Such embodiments also reduce the need for large, expensive tools and heavy equipment during assembly, dis-assembly, and operation of the dewatering system 10.

The base 20 may be formed from a plurality of components, which may be arranged in a generally rectangular configuration. In some embodiments, the base 20 may include at least four components that are connected together to form a perimeter of the rectangular configuration. The base 20 may be formed in various sizes, but may include a length (i.e., along the exterior side 22 or the interior side 24) of about 5 feet, about 7.5 feet, about 10 feet, about 15 feet, about 20 feet or more. The base 20 may include a depth of about 3 feet, about 5 feet, about 7 feet, about 10 feet, about 15 feet or more. The components may be secured together by various methods of attachment, such as by fasteners (e.g., via nut and bolt combinations, screws, rivets), welding, or the like. In certain embodiments, additional components may extend between the perimeter of the base 20 so as to provide additional structural support for the base 20. As shown in FIGS. 5-7, the base 20 is orientated generally horizontally. As such, the base 20 is configured to be positioned on a ground surface and to provide structural support for the remaining components of the support frame 12.

The exterior side 22 may be formed from a plurality of components, which may also be arranged in a rectangular configuration. In some embodiments, the exterior side 22 may include at least four components that are connected together to form a perimeter of the rectangular configuration. The components may be secured together by various methods of attachment, such as by fasteners (e.g., via nut and bolt combinations, screws, rivets), welding, or the like. The exterior side 22 may be formed in various sizes, but may include a height of about 5 feet, about 7.5 feet, about 10 feet, about 15 feet, about 20 feet or more. In some embodiments, a bottom component of the exterior side 22 may be the same component as an exterior component of the base 20 (i.e., the exterior side 22 and the base 20 share a common component). In certain embodiments, additional components may extend between the perimeter of the exterior side 22 so as to provide additional structural support for the exterior section 22. The exterior side 22 is configured to extend generally vertically with respect to the base 20, and particularly, the exterior side 22 generally extends from an exterior-most portion of the base 20.

The interior side 24 may be formed from a plurality of components, which may also be arranged in a rectangular configuration. In some embodiments, the interior side 24 may include at least four components that are connected together to form a perimeter of the rectangular configuration. The components may be secured together by various methods of attachment, such as by fasteners (e.g., via nut and bolt combinations, screws, rivets), welding, or the like. In some embodiments, a bottom component of the interior side 24 may be the same components as an interior component of the base 20 (i.e., the interior side 24 and the base 20 share a common component). Similarly, in some embodiments, a top component of the interior side 24 may be the same component as a top component of the exterior side 22 (i.e., the interior side 24 and the exterior side 22 share a common component). Regardless, the interior side 24 is generally configured to extend upward from the base 20, and particularly, the interior side 24 may generally extend from an interior-most portion of the base 20 to an upper-most portion of the exterior side 22. In certain embodiments, additional components may extend between the perimeter of the interior side 24 so as to provide additional structural support for the interior side 24. Furthermore, additional components may extend between each of the base 20, the exterior side 22, and the interior side 24 so as to provide additional structural support for the support frame 12.

Remaining with the interior side 24 in more detail, as perhaps best shown in FIG. 5, the interior side 24 may be orientated at an angle θ with respect to the base 20 and/or with respect to the ground surface on which the support frame 12 is position. The particular angle θ may be set so as to allow the support frames 12 to support the slurry that is to be dewatered during dewatering operations. However, such particular angle θ should also facilitate the ability of the slurry to be filtered through the geo-fabric material 16 in an efficient manner, such that the effluent water can be quickly extracted from the slurry. Embodiments of the present invention may provide for the angle θ between the interior side 24 of the support frame 12 to be between 45 to 80 degrees, between 50 and 75 degrees, between 55 and 70 degrees, between 60 and 68 degrees, or about 66 degrees with respect to the base 20 and/or the ground surface.

Figure 8:
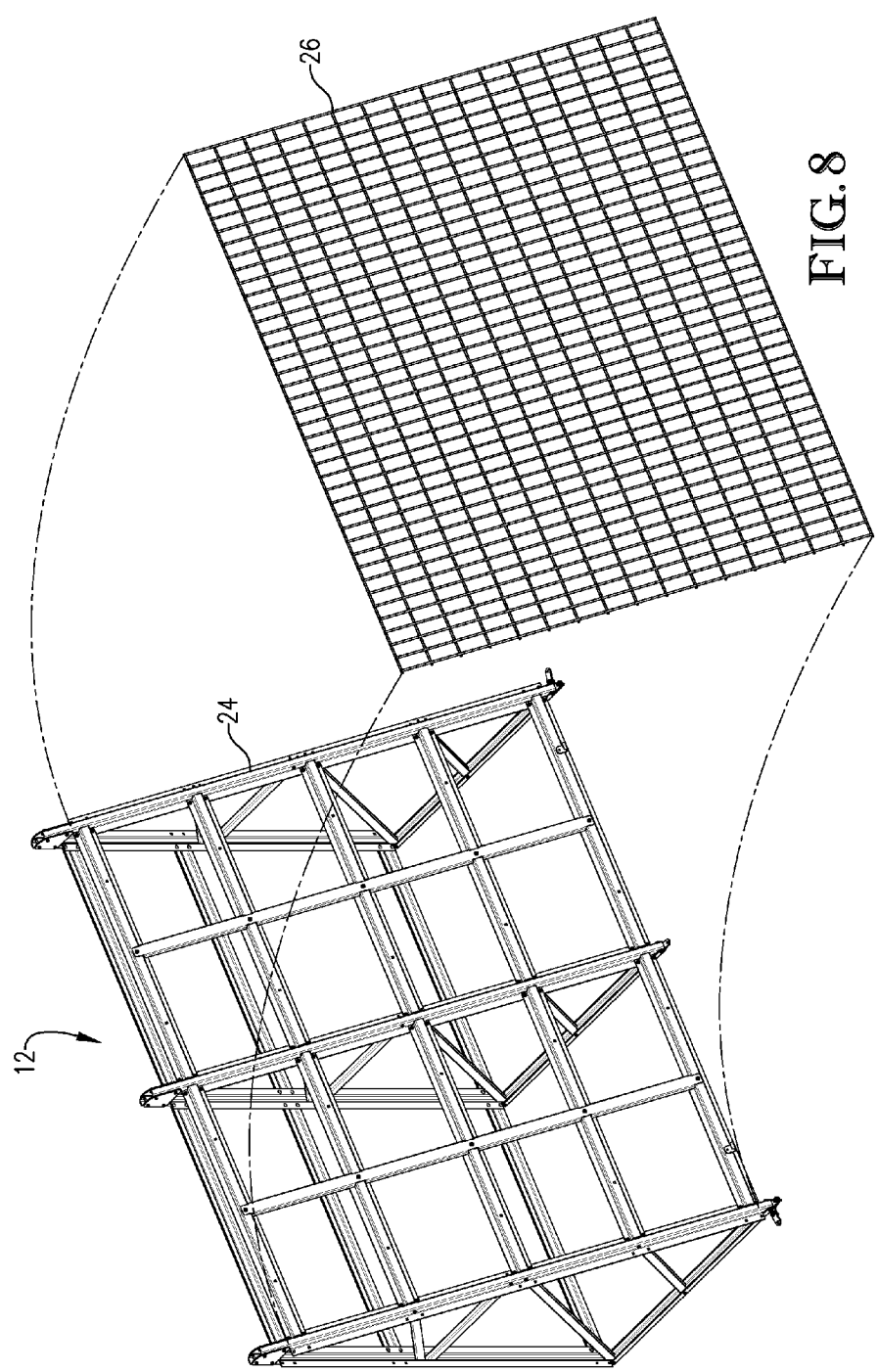
FIG. 8 is an interior side perspective view of a support frame according to embodiments of the present invention, particularly illustrating a grating being integratable with the interior side of the support frame.

In some embodiments, as illustrated in FIG. 8, the interior side 24 of the support frame 12 may be covered with a grating 26, such as a metal mesh or heavy gauge wire panels. The grating 26 may be secured to the interior side 24 by various methods of attachment, such as by fasteners, wire-ties, welding, or the like. As such, the support frame 12 is configured to provide enhanced support for the geo-fabric material 16 as it is supported on the interior side 24 of the support frame 12. Furthermore, the grating 26 may be used to help the support frames 12 provide a more uniform filtering surface and to resist damage when cleaning out the dewatering system 10.

The geo-fabric material 16 that is positioned on the interior sides 24 of the support frames 12 of the dewatering system, as illustrated in FIG. 2, may comprise various types of liquid-permeable fabric that has the ability to filter particulates from liquid. In some embodiments, the geo-fabric material 16 may be formed from polypropylene or polyester, and may be woven, needle punched, or heat bonded geotextile. In some specific embodiments, the geo-fabric material 16 may comprise GEOTEX™ 104F. However, it is understood that other types of geo-fabric material 16 may be used, with such types being dependent on the specific requirements of the dewatering operations (i.e., the type of particulates required to be filtered from the slurry). In particular, it may be beneficial for the effluent water to drain through the geo-fabric material 16 as quickly as possible, while maintaining the geo-fabric material's 16 ability to filter particulates from the slurry. As such, in certain embodiments, the specific geo-fabric material 16 may be chosen as a compromise of the geo-fabric material's 16 ability to completely filter the slurry and to quickly filter the slurry. In some embodiments, the geo-fabric material 16 may be provided in rolls that allow for quick application of the geo-fabric material 16 onto the interior side 24 of the support frames 12 of the dewatering system 10. In some embodiments, the geo-fabric material 16 may be provided in rolls that are about 3 feet wide, about 5 feet wide, about 7 feet wide, or about 10 feet wide, or the like.

Figure 9:
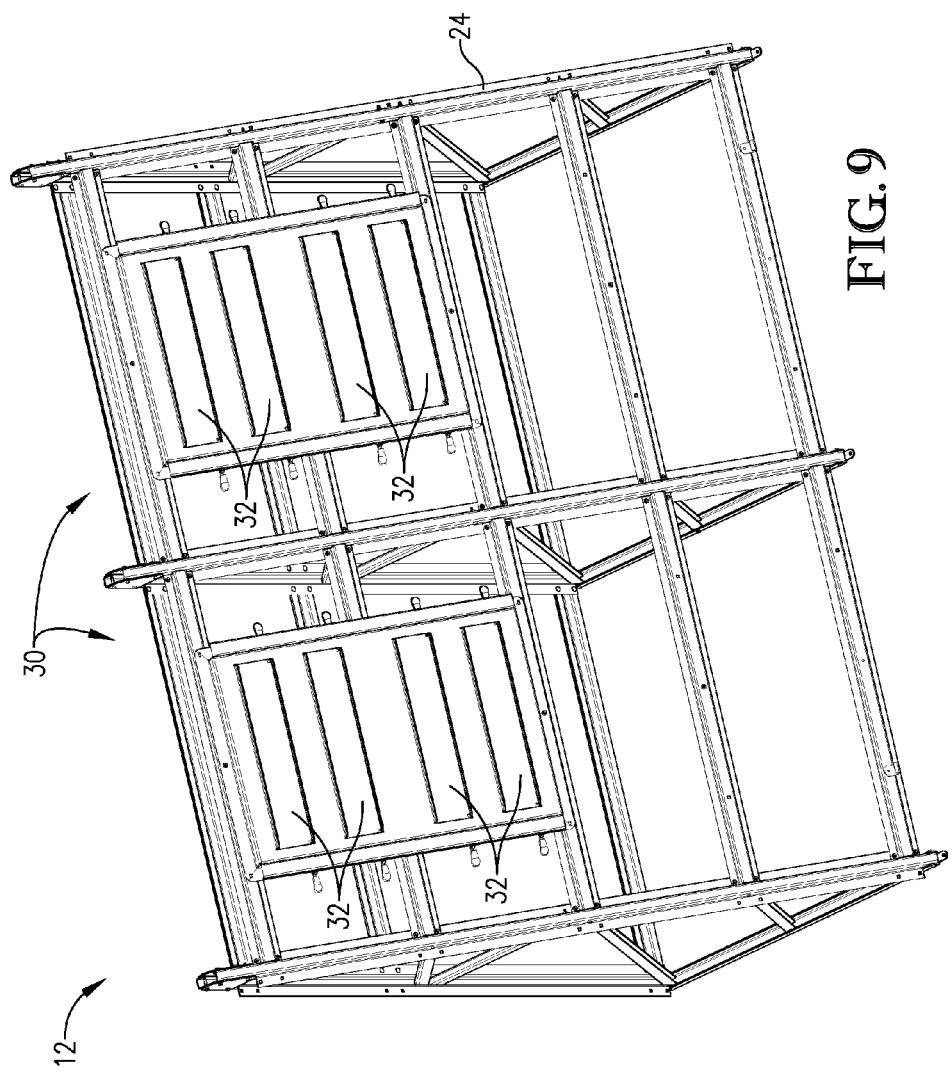
FIG. 9 is an interior side perspective view of a support frame according to embodiments of the present invention, with the support frame including a dump door assembly with a plurality of hatches configured to be selectively rotated between a closed position and an open position.
Figure 10:
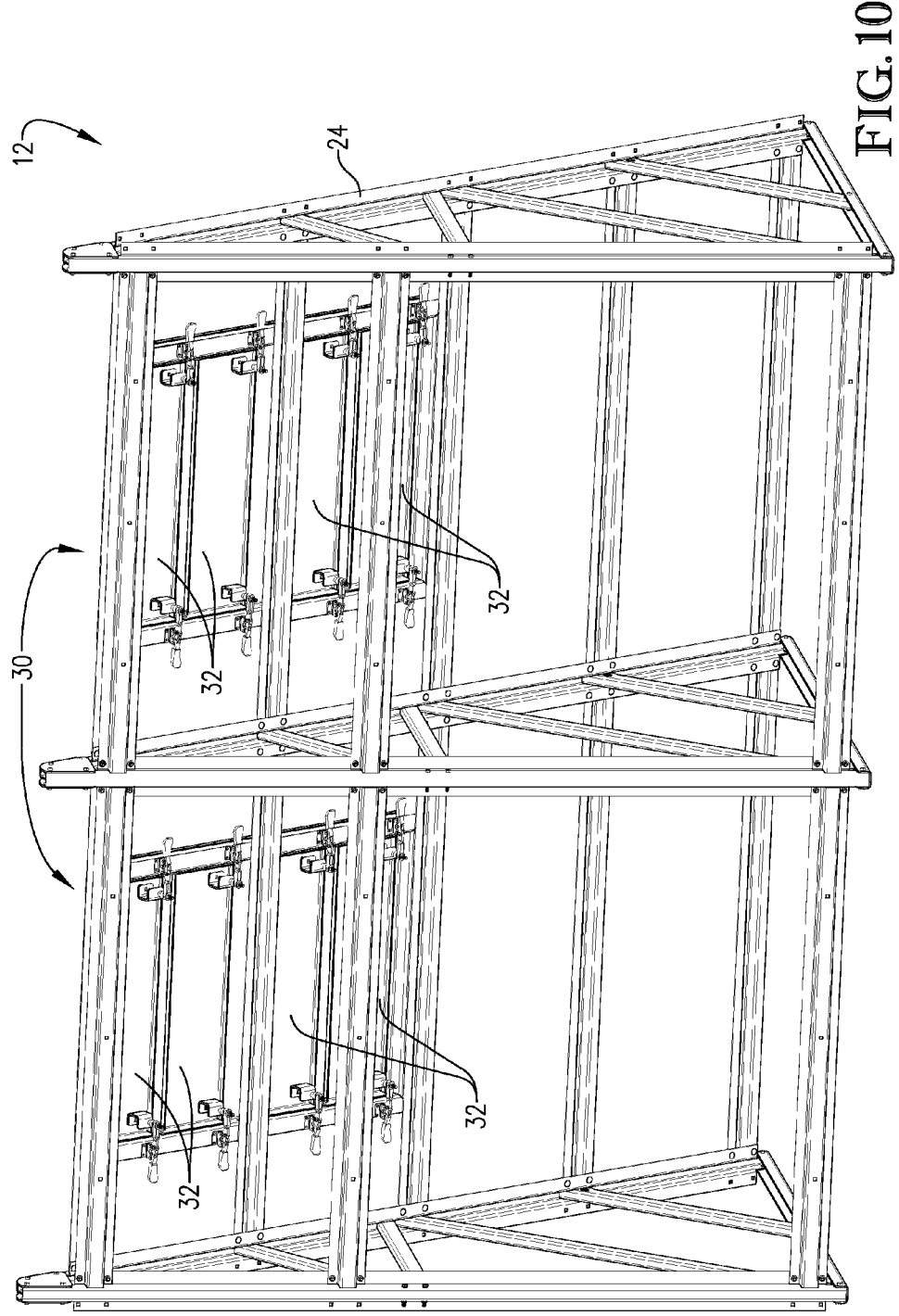
FIG. 10 is an exterior side perspective view of the support frame and dump door assembly from FIG. 9.
Figure 15:
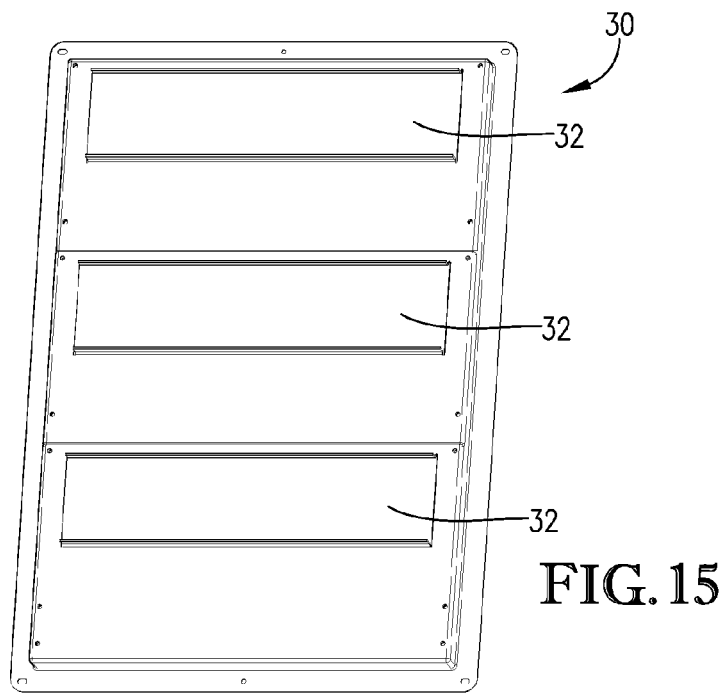
FIG. 15 is a perspective view of an additional embodiment of a dump door assembly according to embodiments of the present invention, with the dump door assembly including hatches that selectively slide from an open position to a closed position.
Figure 16:
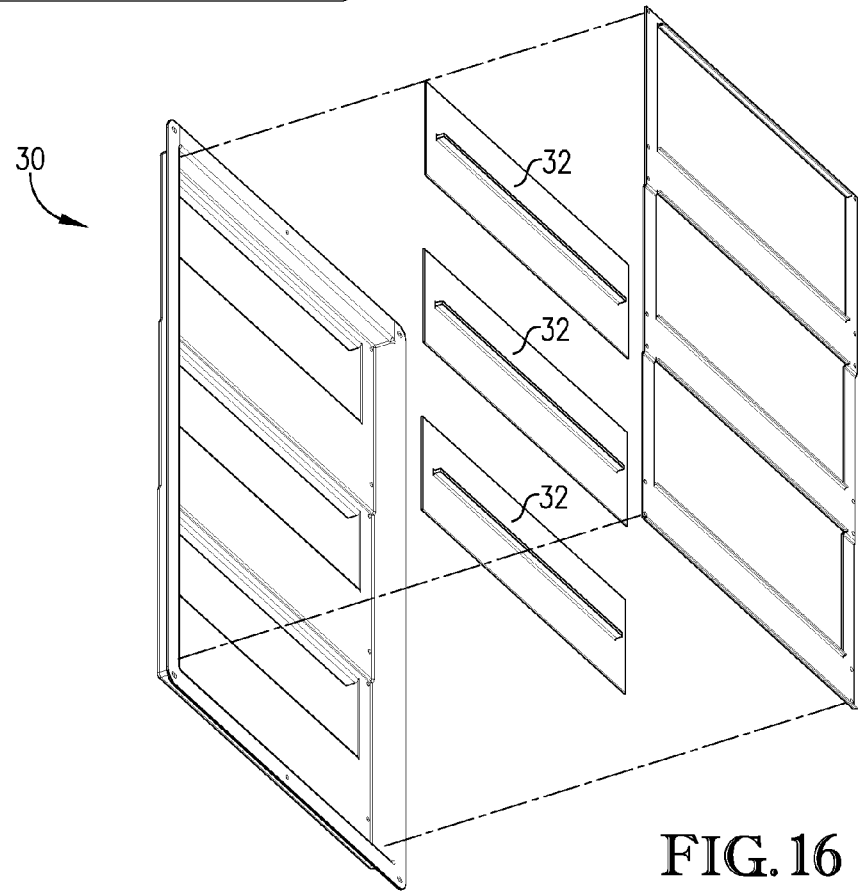
FIG. 16 is an exploded perspective view of the dump door assembly from FIG. 15.
Figure 17:
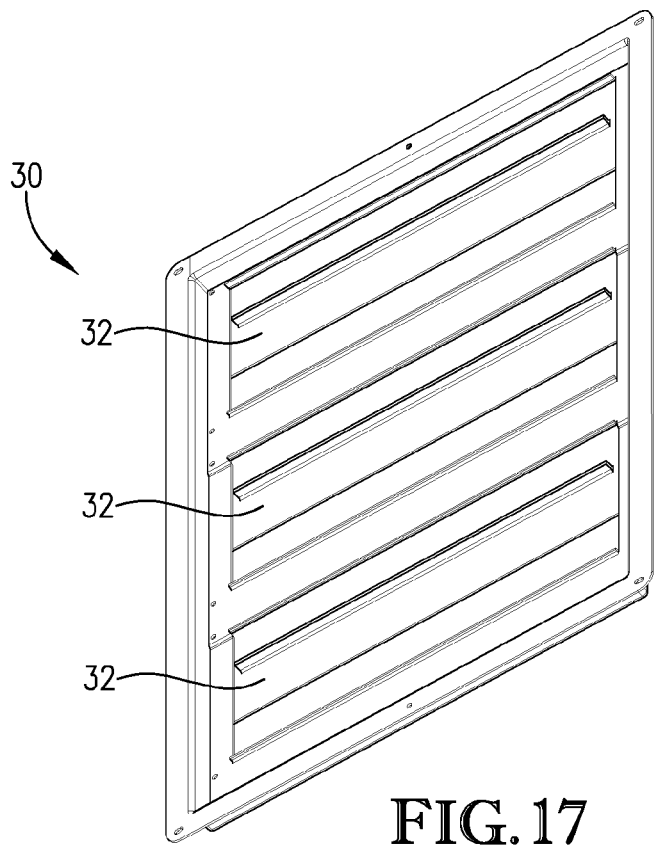
FIG. 17 is a perspective view of the dump door assembly from FIG. 15, with the hatches in the closed position.
Figure 18:
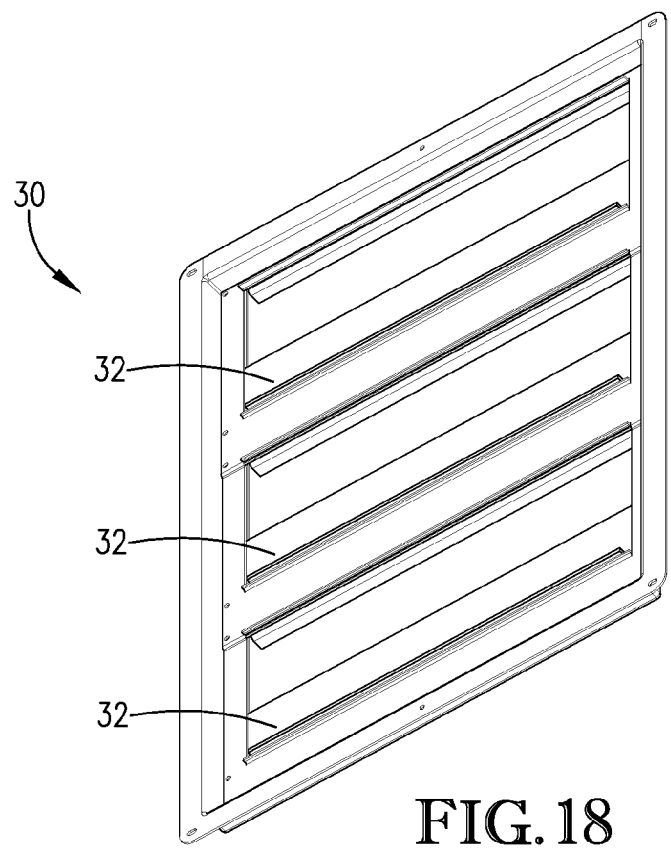
FIG. 18 is a perspective view of the dump door assembly from FIG. 15, with the hatches in the open position.
Figures 19, 20:
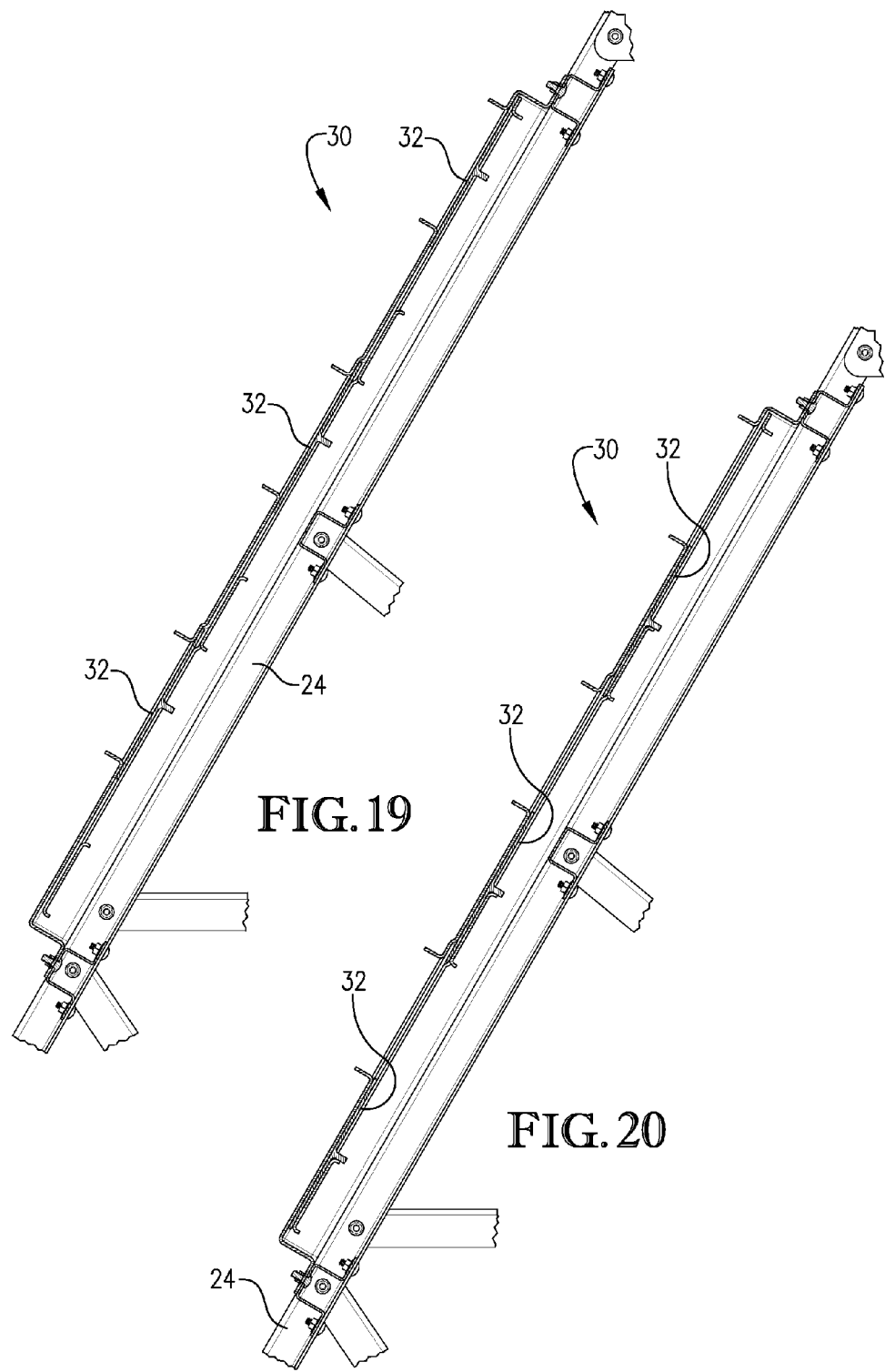
FIG. 19 is a cross-section view of the dump door assembly from FIG. 15 integrated with a support frame, with the hatches in the closed position.
FIG. 20 is a cross-section view of the dump door assembly and support frame from FIG. 19, with the hatches in the open position.

In some embodiments, one or more of the support frames 12 of the dewatering system 10 may include a dump door assembly 30, as illustrated in FIGS. 9 and 10. The dump door assembly 30 may include one more hatches 32 positioned on the interior side 24 of the support frame 12. For example, the dump door assembly 30 may include two columns of hatches 32, with each column including four hatches 32 positioned one above another. Nevertheless, it should be understood that the dump door assembly 30 may include more or fewer columns and/or more or fewer hatches 32 in each column. Regardless, returning to the exemplary dump door assembly 30 of FIGS. 9 and 10, each of the columns may include an upper-most hatch 32, a lower-most hatch 32, and one or more intermediary hatches 32.

Each of the hatches 32 may be hingedly connected to the support frame 12, such that the hatches are permitted to rotate about the hinged connection. For instance, with reference to FIGS. 9 and 10, a top edge of each of the hatches 32 may be hingedly connected to the interior side 24 of the support frame 12, such that the hatches 32 may rotate from a closed position (e.g., FIGS. 9-10), with the hatches 32 being generally parallel or coplanar with the interior side 24 of the support frame, to an open position (e.g., FIG. 12), with the hatches 32 being pivoted towards the exterior side 22 of the support frame 12. As such, with a hatch 32 in the open position, effluent water that is at a height equal to or greater than the hatch 32 can be expelled from the interior space 14 of the dewatering system 10. Each of the hatches 32 may be secured in the closed position with a latching mechanism 34 positioned on either, or both, sides of the hatches 32. In some embodiments, as shown in FIGS. 11 and 12, the latching mechanism 34 may comprise a hand-lever associated with a stopper. Each of the latching mechanisms 34 may secure the hatches 32 in the closed position by its stopper being forced into rigid contact with its associated hatch 32, near a bottom edge of the hatch 32. In some embodiments, the stopper may be forced into rigid contact with a bracket extending from the hatch 32. To open the hatches 32, the handles of the latching mechanisms 34 may be actuated so as to force the stoppers away from the hatches 32, thereby allowing the hatches 32 to swing open under the force of gravity or the force of the effluent water contained within the dewatering system 10. FIG. 13 further illustrates the hatches 32 in the closed position, while FIG. 14 illustrates the hatches 32 rotated to an open position.

In addition to embodiments of the dump door assembly 30 that provide for the hatches 32 to rotate open and closed, other embodiments, as shown in FIGS. 15-20, may provide for the hatches 32 to linearly translate, i.e., vertically-slide up and down, along the interior side 24 of the support frame 12. As such, each of the vertically-sliding hatches 32 may be translated from a closed position (e.g., FIGS. 17 and 19), which does not present an opening for effluent water to escape the interior space 14 of the dewatering system 10, to an open position (e.g., FIG. 18), which presents an opening to allow effluent water escape from the interior space of the dewatering system 10. In some embodiments, the vertically-sliding hatches 32 may be individually actuated by mechanical, pneumatic, or electrical-based actuators. However, in other embodiments, all of the vertically-sliding hatches 32 of the dump door assembly 30 may be actuated together, such that they may be opened and closed in unison.

Regardless of whether the hatches 32 are configured to rotate or linear actuate (i.e., vertically-slide), the dump door assembly 30 is configure to facilitate efficient removal of effluent water from the dewatering system 10. Specifically, the dump door assembly 30 allows the dewatering system 10 to act as a settling pond, when the hatches 32 are in the closed position, and to subsequently provide fine control for draining off the effluent water remaining on top, after the solid material has been separated. In more detail, as slurry is introduced into the interior space 14 of the dewatering system (to a fill level located above one or more of the hatches 32 of the dump door assembly 30), the hatches 32 may be opened to allow for efficient removal of effluent water. To ensure that the effluent water is sufficiently clarified, the slurry should generally sit within the dewatering system 10 for a long enough period that the solid material (being dredged from the body of water 17) has settled to the bottom of the dewatering system 10 to leave effluent water on the top (See, e.g., FIG. 5). After such a period has elapsed, the upper-most hatches 32 should be initially opened, slightly at first, allowing the effluent water to bleed off. Thereafter, the uppermost hatches 32 may be fully opened, so as to allow for complete removal of effluent water that is positioned equal to or above the upper-most hatches 32. The remaining hatches 32 should be operated in a similar manner from highest to lowest. As such, the hatches 32 allows for rapid and controlled draining of the dewatering system 10 after the solid material has separated from the effluent water in the slurry.

Figure 21:
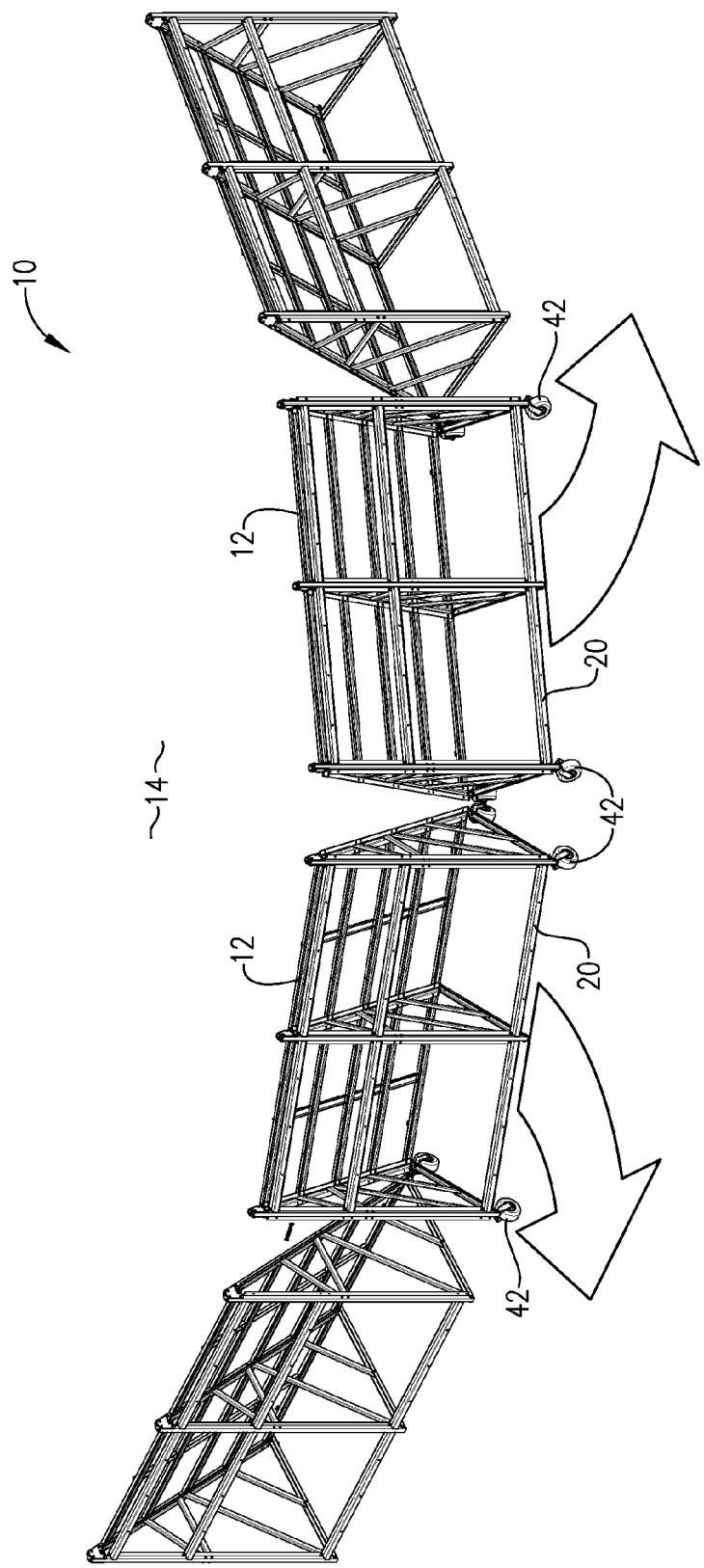
FIG. 21 is a perspective view of a plurality of support frames according to embodiments of the present invention, with the two center support frames forming a gate assembly and configured in a closed position.
Figure 22:
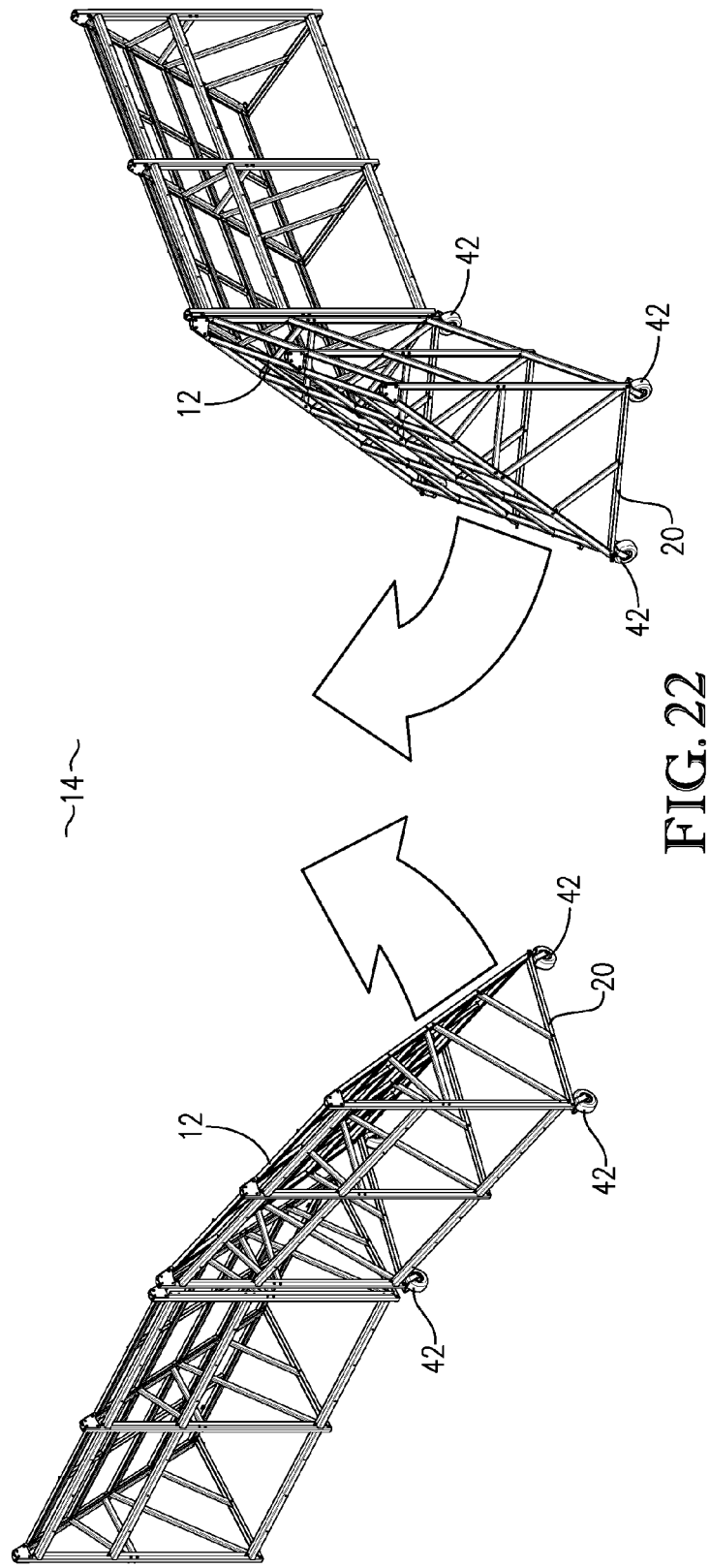
FIG. 22 is a perspective view of the plurality of support frames from FIG. 21, with the two center support frames forming the gate assembly configured in an open position.

In additional embodiments of the present invention, as illustrated in FIGS. 21 and 22, the dewatering system 10 may include a gate assembly 40, which may comprise one or more pairs of adjacent support frames 12 that each include wheels 42 on their bases 20. Specifically, the bases 20 of each of such support frames 12 of the gate assembly 40 may include four wheels 42, with a wheel 42 being positioned at each corner of the base 20, particularly when the base 20 is comprised of components arranged in a rectangular configuration. In other embodiments, the bases 20 of each of such support frames 12 may include two wheels 42, with a wheel 42 positioned on each corner of the base 20 that is adjacent to the exterior side 22. Alternatively, the bases 20 of each of such support frames 12 may include two wheels 42, with a wheel 42 being positioned at each corner of the base 20 that is adjacent to the interior side 24. Regardless, with the wheels 42 on the bases 20 of the support frames 12 that comprise the gate assembly 40, the support frames 12 can be rotated away from each other, as illustrated in FIG. 22, so as to act as a gate to provide access to the interior space 14 of the dewatering system 10. As will be described in more detail below, such a gate assembly 40 is configured to provide access to the interior space 14 of the dewatering system 10 to facilitate set-up, tear-down, maintenance, and clean-outs of the dewatering system 10.

In operation, the dewatering system 10 can be set-up and used to dewater slurries dredged from a body of water, such as the body of water 17 illustrated in FIG. 3. In general, a preferred site 44 for the setting-up the dewatering system 10 may be a relatively flat area close to the body of water 17 that is being dredged (hereinafter referred to as the "source" 17), and with a slight, gradual slope towards the source 17. Nevertheless, the dewatering site 10 may be located a mile or more from the source 17, as long as the flow path back to the source 17 is unimpeded. As such, effluent water separated from the slurry, via the dewatering system 10, may efficiently flow back to the source 17. In the event that the dewatering site 44 is not flat, it may be advisable to use anchor stakes (discussed in more detail below) to re-inforce and to stabilize the support frames 12 of the dewatering system 10.

The dewatering system 10 drainage back to the source 17 may, in some embodiments, be designed, either through natural flow patterns of ground contours or through the use of berms, such that at least fifty percent of the ground surface area around the sides of the dewatering system 10 up-slopes from the source 17 and remains dry during operation of the dewatering system 10. Any such berms are not required to be overly tall, as long as they are tall enough to contain the effluent flow from the dewatering system as it returns back to the source 17. The berms may be placed directly against the outside of the dewatering system 10 but a little space between the berms and the dewatering system 10 may be preferable. In some embodiments, local materials may be used in the building of the berms, so as to make restoration easier after use of the dewatering system 10. For example, long tubular sand bags filled with local material (e.g., soil, rock, vegetation, etc.) may be used to create berms, if such local materials are readily available.

In some embodiments, the selected site 44 may be selected to be at least twice the size of the dewatering system 10, so as to provide sufficient space to setup and positioned the dewatering system 10. In general, however, it may be preferable to keep site 44 preparation to a minimum, so as to avoid unneeded damage to the local environment. For example, any natural grasses in place may be left undisturbed as they may be used as a base for supporting the dewatering system 10. Such natural grasses (or other vegetation bases) may serve to assist in the filtration of the slurry. Although a well-established vegetation base may be preferred for use as a base for the dewatering system 10, asphalt and concrete-covered areas (e.g., parking lots) may also be acceptable. In addition, other non-natural bases may be used on which to set-up the dewatering system 10, so as to act as a hard-deck base for the dewatering system 10. For instance, one or more sections of plywood, one or more sections of plastic, or gravel may be used as a base for the dewatering system.

To setup the dewatering system 10, the support frames 12 can be laid out at the dewatering site 44 in a rough outline of the completed dewatering system 10, such as illustrated in FIG. 1. The dewatering system 10 can be configured in various closed shapes, such as circles, ovals, rectangles, or the like. The dewatering system 10 is not required to be round as it can be formed to the shape of the available ground contours. Nevertheless, reverse curves should be kept to a minimum to maintain structural integrity of the dewatering system 10 and to enhance the safety of the dewatering system 10. The number of support frames 12 used in the dewatering system 10 can vary, and may be dependent on the overall size and operational requirements of the dewatering system 10. In particular, embodiments of the present invention provide for the dewatering system 10 to be scalable, such that its size can be matched to a minimum size required for operational requirements. The operational requirements may be stipulated by the output of the dredging vessel 19 being used to dredge material from the source 17. The higher the output of the dredging vessel 19, the more slurry will be pumped into the dewatering system 10 and the larger the dewatering system 10 may need to be. In some instances, the dewatering system may include between 10 and 150 support frames 12, between 25 and 125 support frames 12, between 50 and 100 support frames 12, or about 65 support frames 12. In certain specific embodiments, the dewatering system 10 may include about 65 frames, about 80 frames, or about 100 frames. Nevertheless, it is understood that a particular size and shape of dewatering system 10 may depend on the specific requirements of the output of the dredging vessel 19 and/or on the space available at the dewatering site 44.

In some embodiments, the support frames 12 may be pre-assembled and installed on individual sections of plywood 48 (See, e.g., FIG. 1) or other hard, flat materials. Such plywood sections 48 may help to support the support frames 12 once the site 44 becomes saturated with liquid from the slurry.

In some embodiments, the components of the support frames 12 may not be provided in a pre-assembled form. In such embodiments, the sections of the support frames 32 may be individually laid out, such that the sections require assembly to form the support frames 12. For example, the base 20, the exterior side 22, and the interior side 24 of each of the support frames 12 may be and laid out (in a disassembled form) in the rough outline of the completed dewatering system 10. Once the support frame 12 sections are laid out in the rough outline of the completed dewatering system 10, assembly of the support frames 12 can begin. For example, the base 20 of a first support frame 12 may be positioned as required. Next, the exterior side 22 and the interior side 24 of the first support frame 12 may be secured to the base 20 and to each other, such as via fasteners, welding, wire-ties, or the like. Once the first support frame 12 has been assembled, the remaining support frames 12 can be assembled in a similar manner until formation of the dewatering system 10 is completed.

As previously described, the support frames 12 may be configured in certain standard sizes (e.g., bases 20 having a length of 10 feet and a depth of 5 feet). Nevertheless, although the support frames 12 may be provided in a standard size, due to potential variations in the site 44 ground contours and/or in the particular placement of the support frames 12, there may be variations in the alignment between the support frames 12 and/or gaps between the support frames 12. To alleviate such alignment issues, some embodiments of the present invention permit the incorporation of support frames 12 with non-standard sizes so as to correct any misalignments or to fill any gaps that may results between the standard-sized support frames.

In addition, some embodiments provide for the support frames 12 to be formed from components that are adjustable in size. For instance, each of the base 20, the exterior side 22, and the interior side 24 may be formed from components with an adjustable size. Such sections may include components that telescopically engage with one another, such that that the length, width, and/or height of the base 20, the exterior side 22, and the interior side 24 may be adjusted. By incorporating the use of such adjustable-size support frames 12, misalignments and gaps between adjacent support frames 12 may be corrected and/or minimized. Similarly, in some embodiments of a dewatering system 10, wedge shaped gaps may be present between adjacent support frames 12, with the gaps widening from the interior side 24 of the support frames 12 to the exterior sides 22. Embodiments of the present invention may incorporate the use of adjustable-size support frames 12 to be configured (i.e., formed in a particular size and shape), such that they can be inserted within such wedge-shaped gaps between adjacent support frames 12. Such embodiments, may be used to increases the strength and stability of the dewatering system 10 by reducing potential weak points in the dewatering system 10.

Upon each of the support frames 12 being assembled, adjacent support frames 12 may be linked together to form the dewatering system 10, such as is illustrated in FIG. 1. To accomplish such linking, as illustrated in FIGS. 23 and 24, each of the support frames 12 may include one or more apertures in the form of eyelets 50 (See FIG. 24) located at corners of the base 20, adjacent to the interior side 24. As such, adjacent (e.g., neighboring) support frames 12 may be secured together with a slotted bracket assembly 52 extending between such support frames 12. Specifically, the slotted bracket assembly 52 may be secured in place via bolts or pins extending through the eyelets 50 and the slotted bracket assembly 52. As such, the support frames 12 can each be secured to and adjacent support frame 12, so as to form a required shape of the dewatering system 10.

To provide additional strength, support, and stability to the dewatering system 10, in some embodiments, as illustrated in FIG. 25, anchors 54 may be incorporated on the support frames 12. The anchors 54 may be slidingly engaged with the exterior sides 22 such that the anchors 54 can be driven into the ground to provide greater resistance to outward pressure on the dewatering system 10, particularly when configured in an oval or in an irregular-shaped configuration. Similarly, in some embodiments, as shown in FIG. 25, the anchors 54 may be incorporated on the interior sides 24 of the support frames 12 (e.g., via the eyelets 50) to resist lifting or flipping of the support frames 12 when the dewatering system 10 is configured in shapes other than a circular.

Furthermore, when setting up the dewatering system 10, in certain embodiments, it may be preferable for the dump door assembly 30 to be positioned at a lowest point of the dewatering site 44, closest to the source 17, such that the effluent water exiting through the dump door assembly 30 can be directed towards the source 17. Contrastingly, the gate assembly 40 may be positioned opposite the dump door assembly 30, so as to facilitate efficient access to the interior space 14 of the dewatering system 10. In some embodiment, the ground on which the gate assembly 40 is positioned may be covered by a layer of plywood, a double layer of plastic sheeting, or the like, to ensure that the support frames 12 comprising the gate assembly 40 can be efficiently moved (e.g., swung open) to facilitate removal of the solid material retained within the interior space 14 of the dewatering system 10, as discussed in more detail below.

Once the support frames 12 have been assembled and arranged in the form of the dewatering system 10, the interior sides 24 of the support frames may be lined with the grating 26, as is illustrated in FIG. 8. As previously described, the grating 26 may be configured to provide support for the geo-fabric material 16. With the grating 26 positioned on the interior side 24 of the support frames 12, the geo-fabric material 16 may be positioned on the grating 26 around the interior sides 24 of each of the support frames 12, as is illustrated in FIG. 2. In some embodiments, the geo-fabric material 16 may be provided in rolls of material, such that the geo-fabric material 16 may be rolled out to position it around the interior sides 24 of the support frames 12. In certain instances, the rolls of the geo-fabric material 16 may be over 7 feet wide, so as to alleviate the need to overlap the geo-fabric material 16 in multiple layers when applying it to the interior sides 24 of the support frames 12 (as may be required when using 3 feet wide geo-fabric rolls). The geo-fabric material 16 may, in some embodiments, be positioned such that it overlaps the bottom and the top of the support frames 12, as is shown in FIG. 5. Specifically, in some embodiments, the geo-fabric material 16 may extend beyond the bottoms of the support frames 12 by at least a foot or more in order to obtain a proper seal when slurry is added to the interior space 14 of the dewatering system 10. Similarly, the geo-fabric material 16 may also be draped over the top of the interior side 24 of the support frames 12, where it is secured via fasteners, such as self-tapping screws, nut and bolt combinations, unbolts, wire-ties, or the like. Similarly, when in a proper position, the geo-fabric material 16 may be secured in place on the grating 26 on the interior side 24 of the support frame 12 via fasteners, such as self-tapping screws, nut and bolt combinations, unbolts, wire-ties, or the like.

In some embodiment, the geo-fabric material 16 may only need to be secured to upper portions of the support frames 12, as the weight of the slurry added within the interior space 14 of the dewatering system 10 may hold the geo-fabric material 16 in position, as illustrated in FIG. 5. Nevertheless, in some embodiments, sandbags may be used to hold down the portion of the geo-fabric material 16 that extends past the bottom portion of the support frames 12, as is also shown in FIG. 5. In embodiments of the dewatering system 10 that include dump door assemblies 30, the geo-fabric material 16 may need to be cut around and secured into the support frames 12 that comprising the dump door assemblies 30, such that the effluent water can flow freely out of the dump door assemblies 30 when the hatches 32 are open.

Once the geo-fabric material 16 is in place a safety cable 56 may be installed around dewatering system 10, such as around the exterior sides 22 of the support frames 12 of the dewatering system 10. As illustrated in FIG. 7, the safety cable 56 may be drawn snug up against the support frames 12 and anchored with a turnbuckle 58. In some embodiments, the turnbuckle 58 may be positioned between the support frames 12 that form the gate assembly 40, such that un-securing the turnbuckle 58 can provide access to the gate assembly 40 and can permit the opening of the gate assembly 40. The safety cable 56 may not need to be extremely tight, as the support frames 12 will shift slightly upon the dewatering system 10 being filled with slurry, such that small amounts of slack of the safety cable 56 will be taken up.

Once the safety cable 56 is in place, the dewatering system 10 may be made operational. Specifically, a discharge pipe 18 extending from the dredging vessel 19 may be installed with a free end extending over the support frames 12 to allow filling of slurry into the interior space 14 of the dewatering system 10. The discharge pipe 18 may be secured in position over the dewatering system 10 via an A-Frame stand positioned near the highest point of the dewatering system 10. The initial portion of the slurry provided to the dewatering system 10 will function to seal the bottom of the geo-fabric material 16 (which extends beyond the bottom portion of the support frames 12) against the ground, as illustrated in FIG. 5. In some embodiments, as shown in FIG. 5, sandbags may be used to assist with sealing the bottom of the geo-fabric material 16 against the ground. As noted above, however, sand bags are not always required to anchor the bottom portion of the geo-fabric material 16. Nevertheless, if sandbags are not used and excessive leakage is detected then the use of sandbags may be required. In many cases, however, the solid material from the slurry will function to quickly block most minor leaks of the dewatering system 10.

Once the interior space 14 of the dewatering system 10 is filled, the solid material from the slurry will begin to settle towards the bottom of the dewatering system 10, while effluent water will remain on top of the settled solid material, as is illustrated in FIG. 5. Regardless, with the dewatering system 10 filled with slurry, the geo-fabric material 16 positioned about the interior sides 24 of the support frames 12 will function as a filter to allow effluent water to permeate through the geo-fabric material 16 and out of the dewatering system 10. Once the effluent water has exited the dewatering system 10, particularly due to the site 44 position for the dewatering system 10, embodiments of the present invention allow the effluent water to flow back to the source 17, as illustrated by FIG. 3.

During such operation of the dewatering system 10, the geo-fabric material 16 may require maintenance to be kept in working condition (i.e., so as to maintain the ability to filter effluent water from the solid material in the slurry). For example, in some instances, the filtering of effluent water via the dewatering system 10 will slow down or stop as the dewatering system 10 is being filled with slurry. Such slowing of the filtering may be due to large quantities of solid material collecting on the geo-fabric material 16. In such instances, maintenance may need to be performed on the geo-fabric material 16, which may include cleaning with a broom, deck brush, shovel, or the like. For example, a user may take the handle of a deck brush and poke the exterior of the geo-fabric material 16 (i.e., the side of the geo-fabric material 16 facing the exterior side 22 of the dewatering system 10) to knock the solid material from the geo-fabric material 16, thereby allowing effluent water to again flow through the geo-fabric material 16. Alternatively, a deck brush may be used to brush the geo-fabric material 16 from the exterior side 22 of the dewatering system 10 until the effluent water again flows through the geo-fabric material 16. In addition to the deck brush, a flat shovel may be used to scrape the solid material from off the interior of the geo-fabric material 16 (i.e., the side of the geo-fabric material facing the interior space 14 of the dewatering system 10). In additional embodiments, the dewatering system 10 may include an automated system for cleaning the solid material that may collect on the interior of the geo-fabric material 16. In particular, as illustrated by FIG. 6, one or more of the support frames 12 may include a vibration device 59 for inducing a vibration through the support frames 12, so as to cause solid material that has built up on the interior of the geo-fabric material 16 to be knocked down. In some embodiments, the vibration device 59 may be integrated with the interior sides 24 of one or more of the support frames 12. The vibration device 59 may comprise various types of mechanisms capable of inducing a vibration, such as a pneumatic piston vibrator, air knocker, air hammer, or the like. In such embodiments, the vibration device 59 can be connected to an air compressor, which powers the vibration device 59 to induce vibration through the associated support frame 12. In other embodiments, mechanical or electro-mechanical vibration devices 59 may be used, such as an electric motor having an unbalanced mass on its driveshaft. In some embodiments, the vibration device 59 used with the dewatering system 10 may be strong enough to impart vibration through multiple adjacent support frames 12. As such, certain embodiments may provide for a single vibration device 12 to be used to clean the geo-fabric material 16 positioned on at least 5, at least 10, at least 15, or at least 20 adjacent support frames 12.

Figure 26:
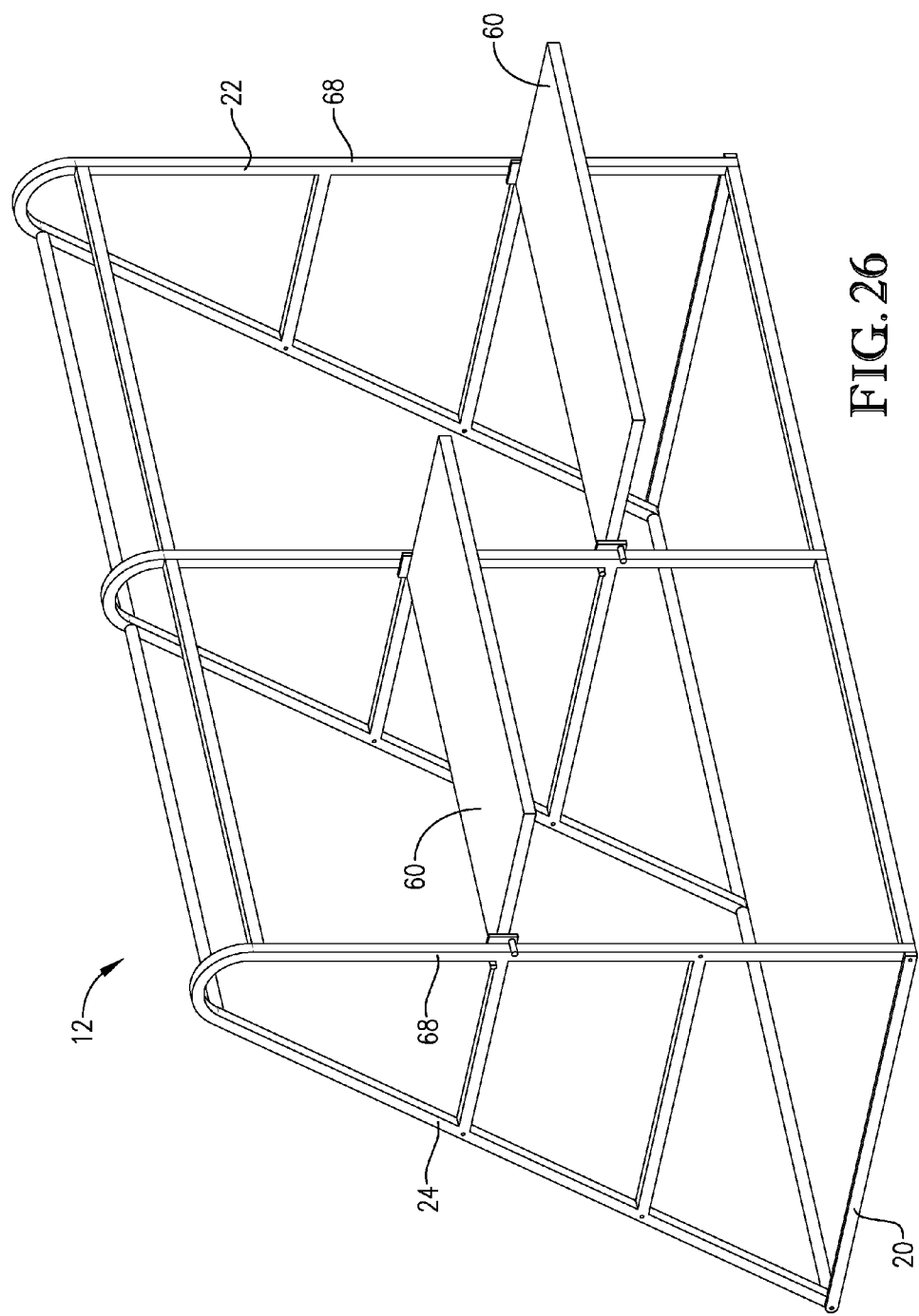
FIG. 26 is an exterior side perspective view of a support frame according to embodiments of the present invention, particularly illustrating work platforms secured to the exterior side of the support frame.

To facilitate such maintenance of the dewatering system 10, certain embodiments of the present invention include components that enhance a user's ability to access the dewatering system 10. Specifically, given that the support frames 12 may be fairly tall (e.g., 10 feet or more), it can be difficult for user to access the interior space 14 of the dewatering system 10. To overcome such issues, embodiments of the present invention may include an adjustable, moveable work platform 60, as illustrated in FIGS. 26-28. The work platform 60 may be configured as an elongated platform which can support a user and/or equipment. As shown in FIGS. 26 and 28, the work platform 60 may be attachable and detachable to the support frames 12 of the dewatering system 10. In some embodiments, the work platform 60 may be attachable and detachable without use of tools, such that the work platform 60 can be moved to different locations (i.e., attached to various support frames 12) on the dewatering system 10 by hand.

As perhaps best shown in FIG. 27, the work platform 60 may include an elongated, rectangular base section 62 formed from wood, metal, composite materials, or the like. The rectangular base 62 provides a main surface of sufficient size to support a user and/or equipment of a user. Furthermore the work platform 60 may comprise an engagement bracket 64 on each of its ends. The engagement brackets 64 may include a pair of offset lugs 66 extending away from the base. A first lug 66 may located at a position lower than the base 62, while a second lug 66 may be located at a position higher than the base 62. As such, to secure the work platform 60 to a particular support frame 12, the work platform 60 may be positioned adjacent to the exterior side 22 of the support frame 12. As previously described, and as shown in FIGS. 26 and 28, the exterior side 22 of the support frame 12 may comprise a pair of vertically-extending sections ("support legs" 68), which present the rectangular configuration of the exterior side 22. The work platform 60 can be positioned such that the first lug 66 on each engagement bracket 64 is positioned on a first side of one of the support legs 68, and the second lug 66 on each engagement bracket 64 is positioned on a second side of one of the frame support leg 68. As such, when a force (e.g., gravity or the weight of user and/or equipment) is applied to the base 62 of the work platform 60, the first lugs 66 are pressed downward and into the frame support legs 68, and the second lugs 66 are pressed upward and into the frame support legs 68, thereby, securing the work platform 60 in place against the exterior side 22 of the support frame 12. As a result, the work platform 60 may be gravity anchored. The work platform 60 allows a user to be positioned at an increased height so as to inspect and perform maintenance on the interior space 14 of the dewatering system 10. Furthermore, the work platform 60 allows the user to be positioned away from where the effluent water is being discharged from the dewatering system 10 (i.e., through the geo-fabric material 16).

Figure 29:
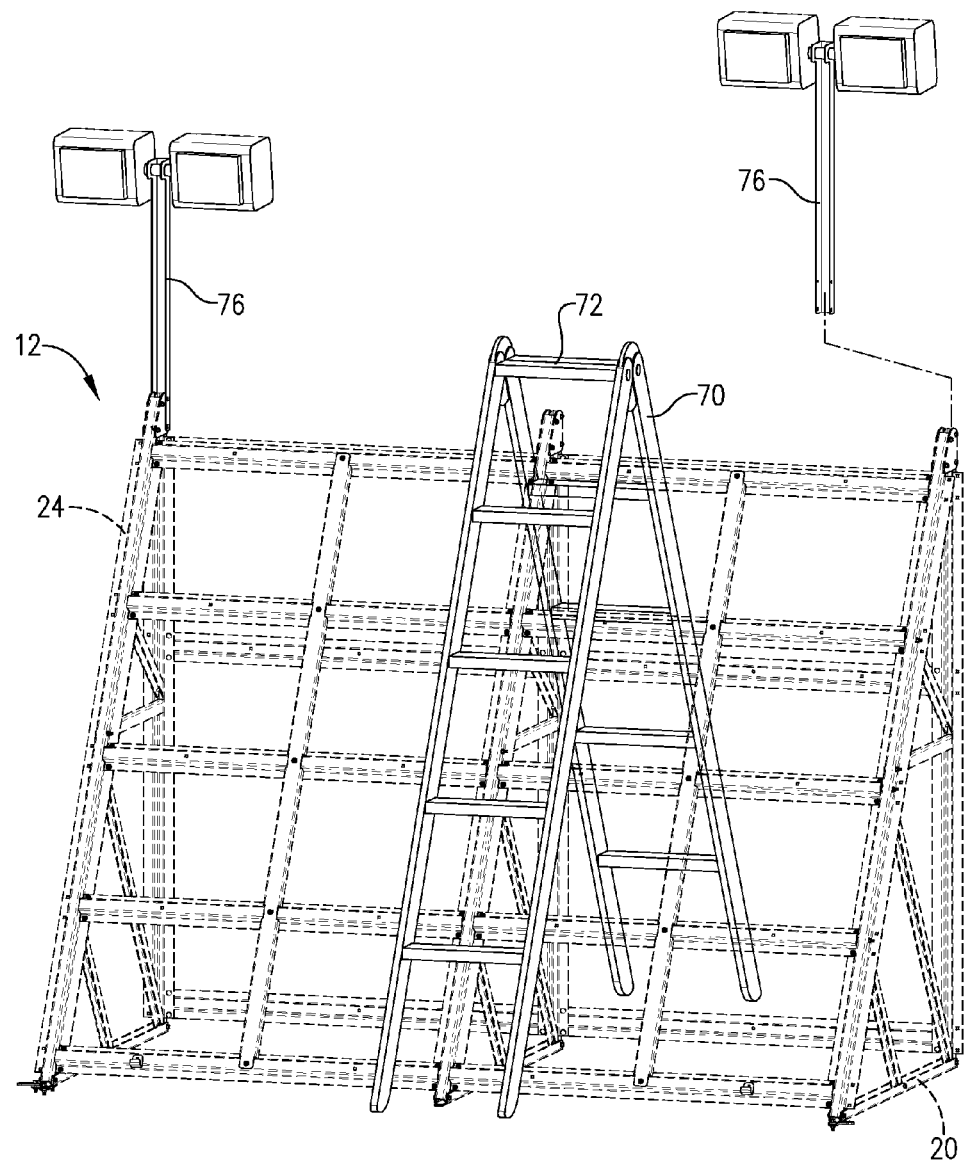
FIG. 29 is an interior side perspective view of a support frame according to embodiments of the present invention, particularly illustrating a ladder and a lighting system integrated with the support frame.
Figure 30:
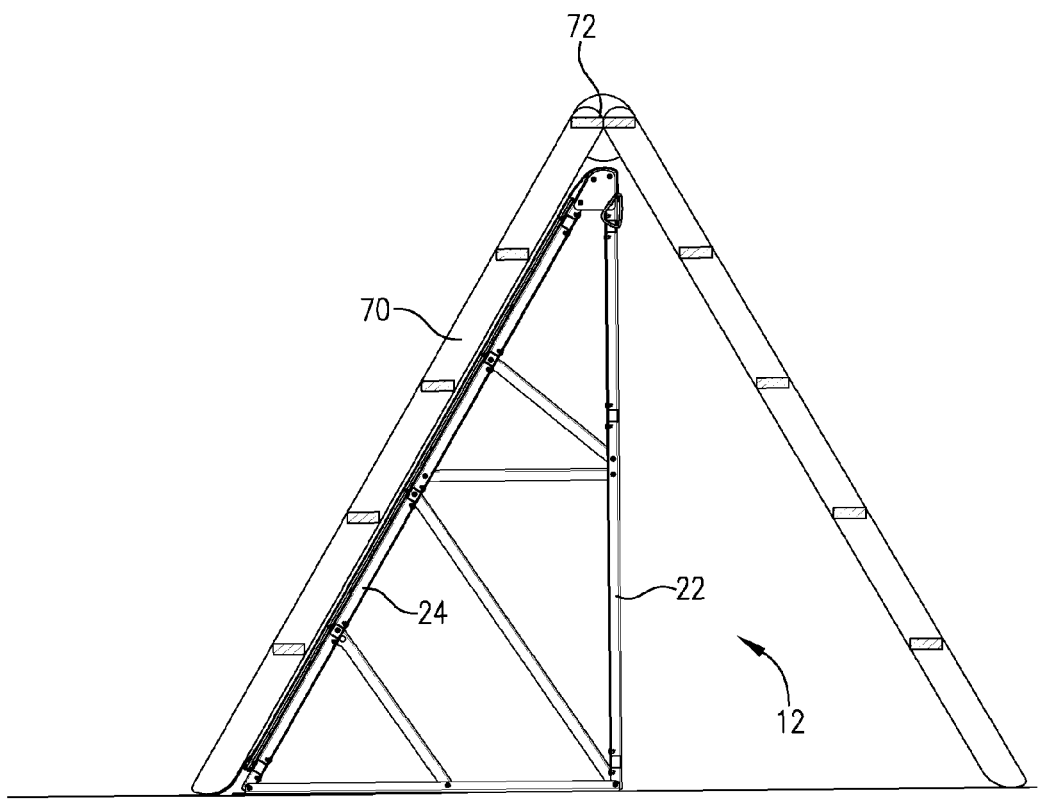
FIG. 30 is a cross-section view of the support frame from FIG. 29, with the lighting system removed from the support system.

In addition to the work platform 60, certain embodiments of the present invention provide for a ladder 70 to be integrated with one or more of the support frames 12, as shown in FIGS. 29 and 30. The dewatering system 10 may include a ladder 70 that extends about both the exterior side 22 and the interior side 24 of a support frame 12. In some embodiments, the ladder 70 may include a support platform 72 at its pinnacle, situated between the portions that extend along the exterior side 22 and the interior side 24. The ladder 70 may be integrated with the support frame 12, such as via fasteners, welding, or the like. The ladder 70 may be used to improve user efficiency by allowing for increased access to portions of the dewatering system 10 for inspections, maintenance, and such. For example, a user may use the ladder 70 to safely view the interior space 14 of the dewatering system 10 during pumping of slurry and filtering of effluent water to ensure proper flow patterns. Additionally, the ladder 70 may provide for efficient ingress and egress from the interior space 14 of the dewatering system 10, as may be required. Such an emergency egress may be particularly useful in the event a user finds themselves in the interior space 14 of the dewatering system 10 when filling of the dewatering system 10 commences.

With the dewatering system 10 filled with slurry, the dewatering system 10 operates by allowing for solid material to settle towards the bottom of the dewatering system 10 and by providing for effluent water to be filtered through the geo-fabric material 16, as is illustrated in FIG. 5. In addition, effluent water may otherwise be discharged from the dewatering system 10 in embodiments of the present invention that include the dump door assembly 30, as illustrated in FIG. 9. In such embodiments, the dump door assembly 30 may generally be used when the dewatering system 10 has been filled completely with slurry, and has sat long enough for the solid material to separate and settle towards the bottom of the dewatering system 10, thereby allowing effluent water located toward the top of the dewatering system 10 to be removed via the dump door assembly 30. To operate the dump door assembly 30, the top-most hatches 32 should be opened slightly allowing the effluent water to bleed off and exit the dewatering system 10. Thereafter, the top-most hatches 32 may be fully opened letting off all effluent water that is positioned above the top hatches 32 water. Once the top-most hatches 32 have been completely opened, the process may be repeated sequentially going from the top-most hatches 32 to the lower-most hatches 32, until all of the effluent water located at or above the dump door assembly 30 has been removed.

Once the effluent was has been removed from the dewatering system 10, the dewatering system 10 can again be filled with slurry to repeat the dewatering process. Specifically, the solid material will again settle towards the bottom of the dewatering system 10, while effluent water can be removed as it is filtered through the geo-fabric material 16 and/or as it exit directly through the dump door assembly 30. This process can be repeated until the dewatering system 10 has been sufficiently filled with solid material, such that it is required to clean the solid material out of the dewatering system 10. In some embodiments, a clean out may be required once the solid material has reached a height that is approximately 6-10 inches from the top of the support frames 12.

Turning to the clean outs of the dewatering system 10 in more detail, after effluent water has been removed from the dewatering system 10, the solid material can be removed from the dewatering system 10. With the effluent water removed, the solid material may be in a compressed state, which is denser then its original in-situ state (i.e., its density as it was located in the source 17). To remove the solid material from the dewatering system 10, the solid material may be required to sit within the interior space 14 of the dewatering system 10 for one or more days depending upon the weather conditions and to allow for any trapped water pockets to work their way to the surface of the solid material and bleed off. Any such trapped water pockets will generally have worked their way to the surface when most of the solid material has cracks across 75-80% of the surface. Specifically, with the effluent water having been removed, the solid material should begin to dry to a generally waterless state that could pass a paint filter test (i.e., a test to identify the presence of free liquids in the solid material for the determination of the hazardous characteristics of ignitability and corrosivity). In such a waterless state the solid material can be removed and trucked away for disposal, such as to a landfill.

The solid material may be cleaned out from dewatering system 10 by various processes. For example, a long reach track-ho or excavator can be used to reach up over the support frames 12 of the dewatering system 10 and dig the solid material from the dewatering system 10. Alternatively, in embodiments in which the dewatering system 10 includes a gate assembly 40, such as illustrated in FIGS. 21 and 22, the dewatering system 10 may be cleaned out by accessing the interior space 14 via the gate assembly 40. In more detail, when the geo-fabric material 16 is applied about the interior sides 24 of the support frames 12, the geo-fabric material 16 may be applied such that it includes an overlapping seam near the position of the gate assembly 40. As such, the seam of the geo-fabric material 16 may be opened to expose the gate assembly 40. In some instances, a long reach track-ho or an excavator may be used to clean out any solid material that may be deposited near the seam, so as to allow the geo-fabric material 16 be separated and folded back enough to allow the gate assembly 40 to be opened and to, thus, facilitate entrance into the interior space 14 of the dewatering system 10. Once the geo-fabric material 16 has been pulled back by the seam around the gate assembly 40, the safety cable 56 (which may have the turnbuckle located adjacent to the gate assembly 40) can be disconnected such that the wheeled support frames 12 that comprise the gate assembly 40 can be separated and/or opened-up. For instance, as shown in FIG. 22, the wheeled support frames 12 can be rotated apart as far as you possible to allow an excavator to enter the interior space 14 of the dewatering system for purposes of removing the solid material from the dewatering system 10. In some instances, in may not be advisable to position a wheeled piece of heavy-equipment (e.g., a wheeled excavator) inside the interior space 14 of the dewatering system 10 as the heavy-equipment could potentially get bogged down or stuck in wet ground. However, as previously described, certain embodiments of the present invention may include a hard deck base, which comprises a heavy-duty covering over the ground in the interior space 14 of the dewatering system 10. In certain embodiments, the hard deck base may comprise wood products (e.g., plywood, lumber, etc.), composites, gravel, pavement, blacktop, or the like. The use of the hard deck base may allow the use of heavy equipment inside the dewatering system 10 without the heavy equipment becoming bogged down or stuck in wet ground.

Figure 31:
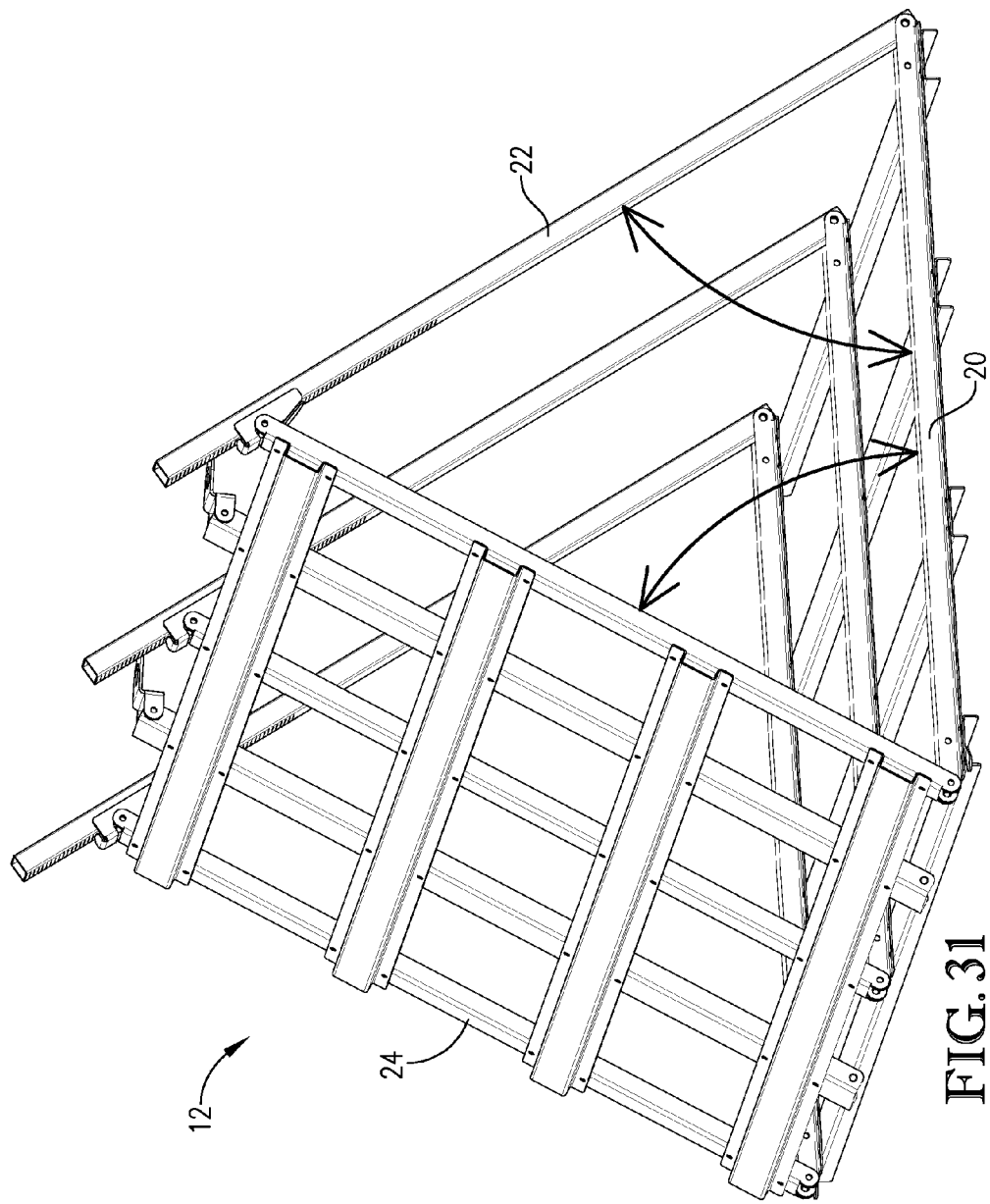
FIG. 31 is a perspective view of a collapsible support frame according to embodiments of the present invention, with the support frame in an erected configuration.
Figure 32:
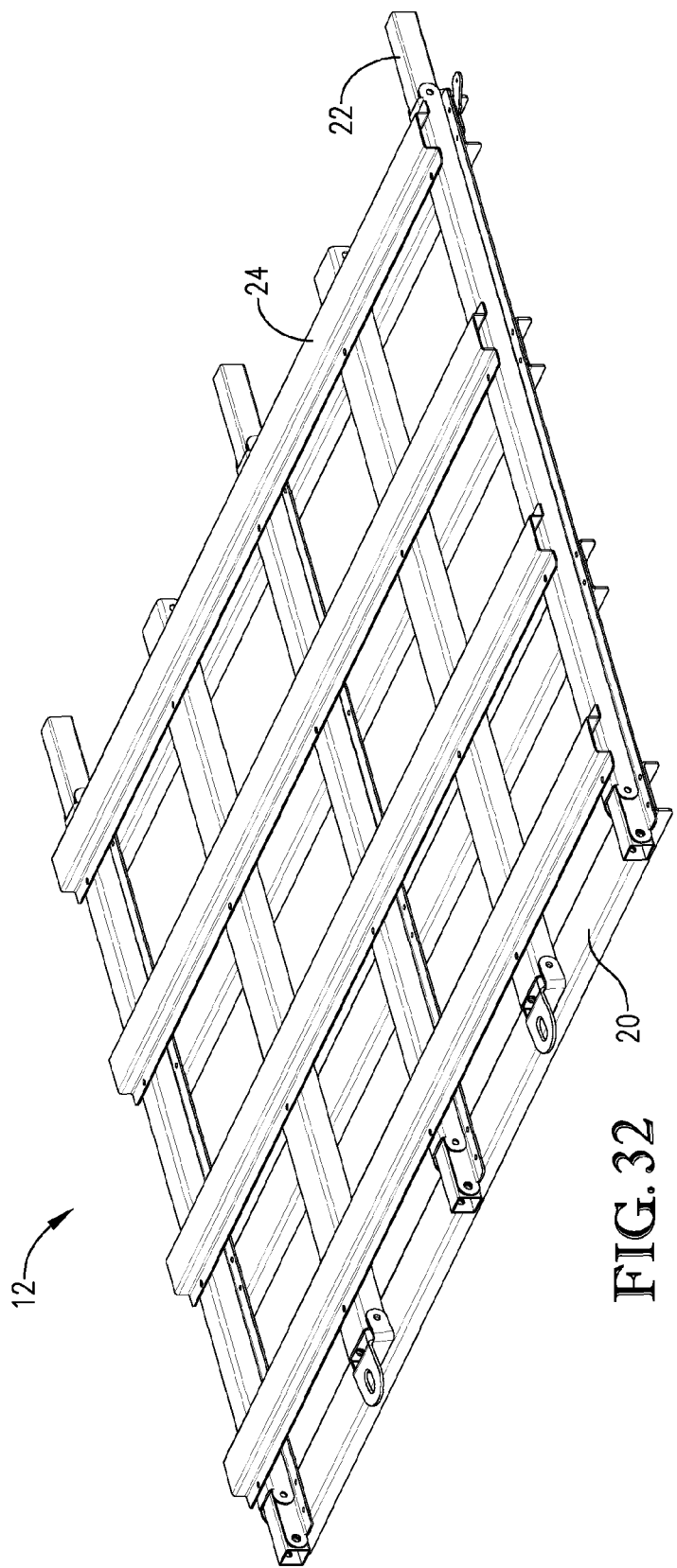
FIG. 32 is a perspective view of the collapsible support frame from FIG. 31, with the support frame in a collapsed configuration.
Figure 33:
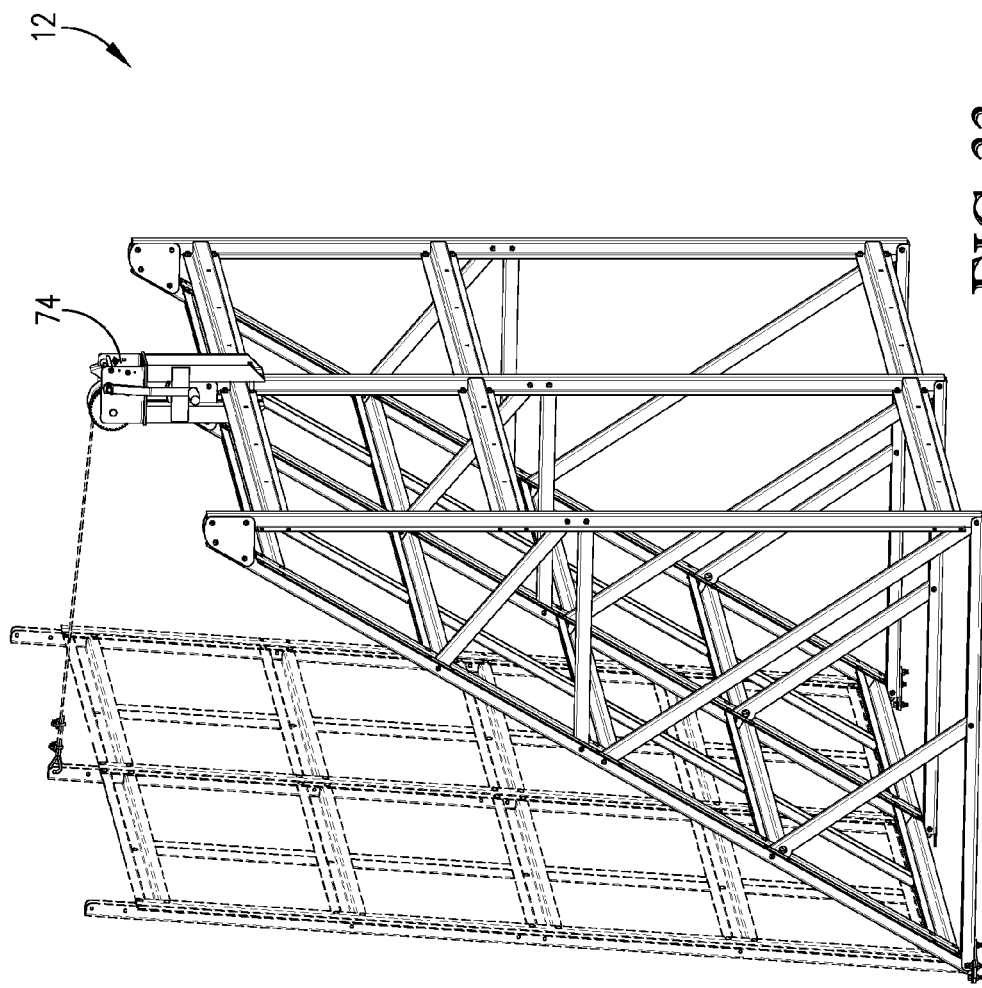
FIG. 33 is a perspective view of a support frame according to embodiments of the present invention, particularly illustrating a winch assembly for positioning components of the support frame.

In some additional embodiments of the present invention, the dewatering system 10 may include one or more collapsible support frames 12 that can be used to provide access to the interior space 14 of the dewatering system, such as illustrated in FIGS. 31 and 32. In such embodiments, the collapsible support frames 12 may be used as an additional embodiment of a gate assembly (i.e., a collapsible clean-out gate), for purposes of providing access to the interior space 14 of the dewatering system 10, as discussed in more detail below. As shown in FIGS. 31 and 32, the collapsible support frame 12 may include the base 20, the exterior side 22, and the interior side 24. Embodiments of the present invention include provide for one or both of the exterior side 22 and the interior side 24 to be hingedly secured to the base 20. Furthermore, the exterior side 22 and the interior side 24 may be secured to each other, at their tops, via pins or another type of easily removable fastener. As such, the pins securing the exterior side 22 and the interior side 24 together can be removed, such that exterior side 22 and the interior side 24 can rotate about the base 20 and be folded into generally flat sections, as illustrated in FIG. 32. As a result, an excavator can drive over the collapsed support frame 12 to enter the interior space 14 of the dewatering system 10, to clean out solid material. In some embodiments, a piece of plywood or other hardened material may be positioned over the collapsed support frame 12 to provide additional support to the excavator as it drives over the collapsed support frame 12. Thereafter, the exterior side 22 and the interior side 24 can be lifted back into place, such that the collapsible support frame 12 is reconfigured as a standard support frame 12. In some embodiments, the collapsible support frame 12 may include an actuator, such as an electronic actuator, a hydraulic actuator, or a manual actuator to assist a user in lifting the exterior side 22 and/or the interior side 24 back in position. For example, as shown in FIG. 33, the support frame 12 may include a winch assembly 74 connected to the exterior side 22 of the collapsible support frame 50. The winch assembly 74 may be used to lift the exterior side 22 and/or the interior side 24, so as to facilitate assembly of the support frame 12.

In some embodiments, it may be preferable or necessary to use more than one dewatering system 10 at a given site. 44. To facilitate the positioning of multiple dewatering systems 10, the site 44 may require to be at least multiple times the size of the dewatering systems 10, such as to provide room for each of the dewatering systems 10 to be setup and used simultaneously. In some embodiments, the site 44 should be large enough to provide for the dewatering systems 10 may be spaced apart sufficiently from each other so that the effluent return flow from each dewatering system 10 does not inundate the area between or behind the dewatering systems 10. As such, embodiments of the present invention provide for heavy equipment (e.g., excavators, back-hoes, etc.) to be positioned close enough to the dewatering systems 10 so that the dewatering systems 10 may be partially evacuated via the heavy equipment extending their buckets into the interior space of the dewatering systems 10 by reaching in from the sides of the dewatering systems 10.

When operating two dewatering systems 10, after the first dewatering system 10 has been filled, the dredging vessel 19 can direct slurry to be pumped into the second dewatering system 10, while the first dewatering system 10 is being cleaned out. Such a configuration may reduce down time. In some embodiments, the discharge pipe 18 extending from the dredge may be fitted with a Y-Fitting that extends out to two smaller individual pipes so as to fill the two dewatering systems 10 simultaneously. Alternatively, the Y-Fitting can be incorporated with two knife valves. In such a configuration the first dewatering system 10 can be filled at full flow from the dredge vessel's 19 discharge pipe 18. When the first dewatering system 10 is full, the valve to the first dewatering system 10 can be closed, and the valve to a second dewatering system 10 can be opened such that the second dewatering system 10 can be filled while the first dewatering system 10 is performing dewatering operations and/or is being cleaned out.

In addition to the embodiments discussed above, additional embodiments of the present invention may include other features for providing beneficial operation of the dewatering system 10. For example, in some embodiments the dewatering system 10 may include a lighting system 76, as illustrated in FIG. 29, attached to one or more of the support frames 12. The lighting system 76 may comprise an electric light elements that extends above the dewatering system 10 via a support post secured to one or more of the support frames 12. The lighting system 76 may be powered by an electrical power source, such as by batteries, a generator, or the like. In some embodiments, the lighting system 70 may be directed at the interior space 14 of the dewatering system 10 so as to provide lighting for operation of the dewatering system 10 during the night and/or inclement weather.

Figure 34:
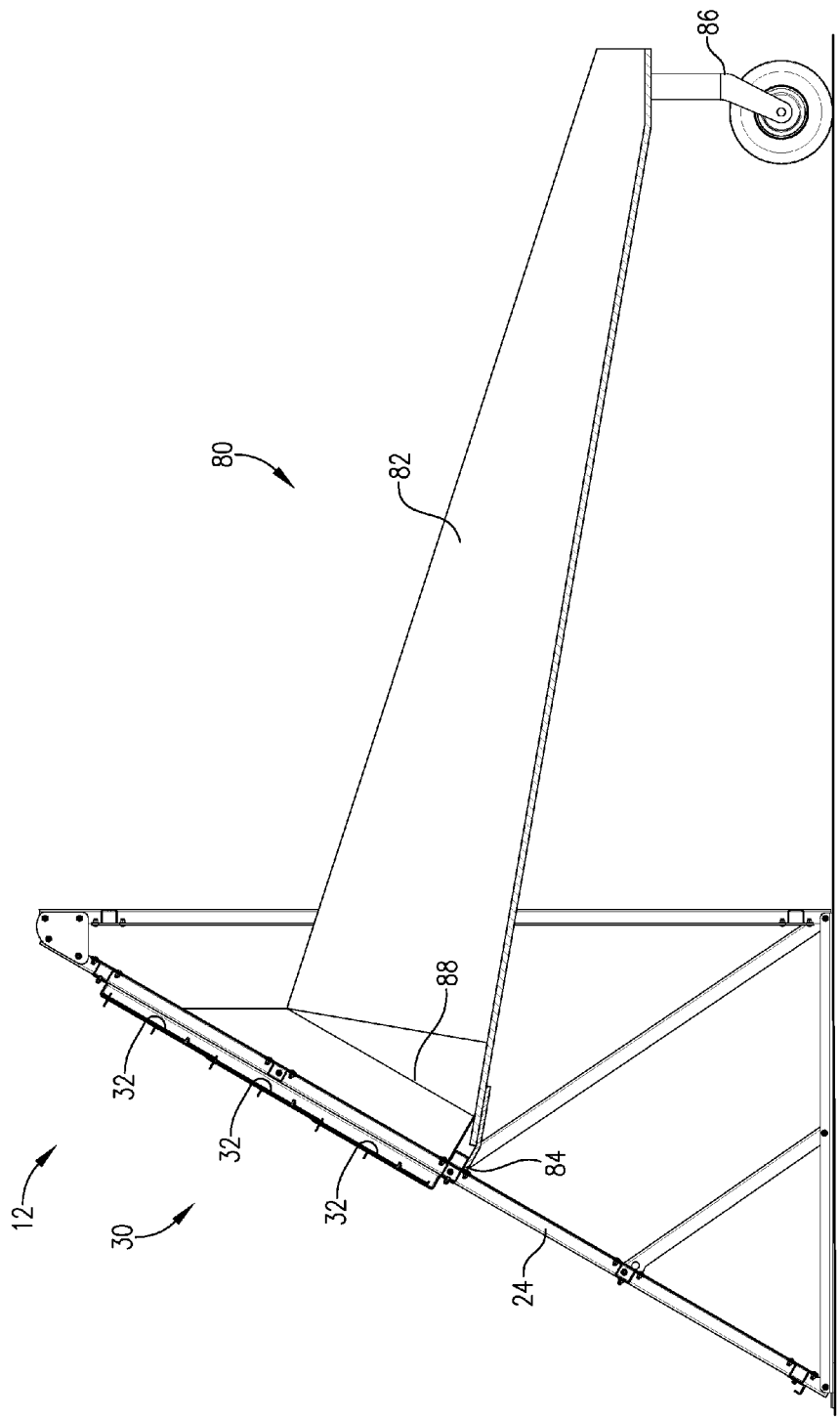
FIG. 34 is a cross-section view of a support frame according to embodiments of the present invention, particularly illustrating a dump door assembly and a sluice assembly extending from the dump door assembly.

In additional embodiments, the dewatering system 10 may include a sluice assembly 80, which may comprise an extended sluice box 82, as illustrated in FIG. 34, which extends from the interior side 24 of one of the support frames 12. In some embodiments, the sluice assembly 80 will be associated with a support frame 12 that includes a dump door assembly 30 with vertically-sliding hatches 32. As such, the sluice assembly 80 can provide for rapid, controlled, and directed evacuation of effluent water from the interior space 14 of the dewatering system 10. In particular, as previously described, each of the vertically-sliding hatches 32 may be individually actuated by mechanical, pneumatic, or electrical-based actuators. With the each of the hatches 32 in a raised, closed position, the dump door assembly 30 blocks effluent water (or any other material) from exiting the dewatering system 10. However, each of the hatches 32 of the dump door assembly 30 can be individually opened so as to provide for drainage of effluent water at any particular height of the dewatering system 10 once turbidity has abated enough where solid material matter can drop out of suspension. For example, the top-most hatches 32 can initially be lowered slightly from a closed position, so as to allow effluent water to begin to bleed out of the dewatering system 10 down into the sluice box 82. Once it has been verified that turbidity has sufficiently ceased around the level of the top hatches 32, the top hatches 32 may be fully opened to allow for maximum flow of effluent water out of the top hatches 32. Subsequently, the lower hatches 32 can be sequentially opened in a similar manner to allow for maximum flow of effluent water out of the dump door assembly 30. As such, vertical movement of the hatches 32 of the dump door assembly 30 allows for fine adjustment to avoid the loss of silt from rolling/turbulent slurry around at lower heights where suspension of the solid particles has not yet reduced.

Beneficially, the sluice box 82 provides for effluent water exiting the dewatering system 10 to be spread out, so as to decrease the energy level of the effluent water. Such a reduction in energy level may be beneficial particularly during periods of maximum effluent water flow, so as to reduce damage to the site 44 and generally to the local environment from such high rates of liquid flow. In addition, some embodiments of the present invention provide for the sluice box 82 to include be pivotally secured to the interior side 24 of the support frame 12 via a pivot point 84, which may comprise a pivot pin, or the like. Additionally, a wheel 86, such as a caster wheel, may be secured to a lower portion of the sluice box 82, such that the sluice box 82 is supported on the ground via the wheel 86. The wheel 86 may be configured to permit the sluice box 82 to pivot about the interior side 24 and/or the dump door assembly 30, so as to direct the effluent water exiting the sluice assembly 80 in an intended direction, such as in a desired fluid flow channel or pipeline. Furthermore, the sluice assembly 80 may include a flexible gasket material 88, such as sections of plastic or rubber, located between the sluice box 82 and the interior side 24 of the support frame 12. The gasket material 88 may be configured to provide a liquid seal to prevent effluent water from leaking out from the top of the sluice box 82; however, the gasket material 88 may be generally flexible so as to facilitate the ability of the sluice box 82 to pivot while maintaining the liquid seal.

In some additional embodiments, as illustrated in FIG. 35, the dewatering system 10 may include one or more gate valve assemblies 90 integrated into one or more of the interior sides 24 of the support frames 12. The gate valve assembly 90 may comprise a generally circular port 92 that is configured to provide a connection for discharge pipes 94 of various sizes to be fluidly connected with the interior space 14 of the dewatering system 10. In addition, the gate valve assembly 90 may include a vertically-shiftable gate 96, which is configured to selectively block or unblock the port 92, so as to thereby open or close, respectively, the gate valve assembly 90. As such, the gate valve assembly 90 can provide rapid evacuation of effluent water from the dewatering system 10 once particulate matter has dropped out of suspension. Alternatively, the gate valve assembly 90 can provide rapid evacuation of any fluid or solid material from the dewatering system 10 in emergency situations.

As illustrated in FIG. 36, embodiments of the present invention may additionally include a portable skirting system 100, which is configured to act as a synthetic flow channel to facilitate the return of the effluent water back to the source 17 without losing valuable water to absorption into the ground or evaporation in high temperature environments. The portable skirting 100 may comprise a non-permeable sheeting 102, such as plastic, polyethylene sheeting. The non-permeable sheeting 102 may be positioned under the support frames 12 around the entire perimeter of the dewatering system 10. The non-permeable sheeting 102 may extend several feet from the base 20 of the support frames 12. The edges of the non-permeable sheeting 102 may be raised, such as via small berms or the like, and secured in place via sandbags 104, anchors, or the like. As such, the portable skirting system 100 is configured to catch and pool the effluent water being filtered through the geo-fabric material 16 of the dewatering system 10. A portion of the non-permeable sheeting 102 may extend from the dewatering system 10 in the direction of the source 17 so as to guide the effluent water back to the source 17. In additional embodiments, instead of surrounding the entire dewatering system 10, the non-permeable sheeting 102 may be positioned adjacent to the sluice assembly 80 and/or the dump door assembly 30, so as to direct the effluent water from the directional sluice assembly 80 and/or the dump door assembly 30 back to the source 17.

Although the invention has been described with reference to the embodiment illustrated in the attached drawing figures, it is noted that equivalents may be employed and substitutions made herein without departing from the scope of the invention as recited in the claims.

The invention claimed is:

1. A dewatering system for separating a slurry into solid material and effluent water, said dewatering system comprising:
   a plurality of support frames arranged to enclose an interior space of said dewatering system, wherein the interior space is configured to receive the slurry;

geo-fabric material positioned on a portion of said support frames, wherein said geo-fabric material is configured to filter the slurry received within the interior space, such that effluent water permeates through said geo-fabric material and is discharged from the interior space; and a dump door assembly associated with at least one of said support frames, wherein said dump door assembly comprises a plurality of hatches configured to selectively open to allow effluent water to be discharged from the interior space of said dewatering system.

2. The dewatering system of claim 1, wherein said support frames each include a base, an exterior side, and an interior side, and wherein said geo-fabric material is positioned on said interior side of said support frames.

3. The dewatering system of claim 2, wherein said interior side extends at an angle with respect to said base, wherein said angle is between 55 and 70 degrees.

4. The dewatering system of claim 2, wherein a grating is positioned on said interior sides of said support frames, wherein said grating is configured to support said geo-fabric material on said interior sides of said support frames.

5. The dewatering system of claim 2, wherein said dump door assembly is integrated with said interior side of said support frame.

6. The dewatering system of claim 5, wherein said hatches of said dump door assembly are configured to rotate between a closed position and an open position.

7. The dewatering system of claim 5, wherein said hatches of said dump door assembly are configured to slide between a closed position and an open position.

8. The dewatering system of claim 5, wherein said hatches of said dump door assembly are configured individually actuate between a closed position and an open position.

9. The dewatering system of claim 2, wherein two adjacent support frames each are interconnected via a bracket assembly connecting a corner of each of said support frames, wherein said corner is located at an intersection of said base and said interior side.

10. The dewatering system of claim 1, wherein said geo-fabric material comprises a polypropylene geotextile.

11. The dewatering system of claim 1, wherein two adjacent support frames each include at least one wheel on a base of said support frames, wherein said wheels allow said support frames to rotate open to provide access to the interior space of said dewatering system.

12. The dewatering system of claim 1, wherein said support frames are secured to the ground via anchors extending from said support frames into the ground.

13. A dewatering system for separating a slurry into solid material and effluent water, said dewatering system comprising:

a plurality of support frames arranged to enclose an interior space of said dewatering system, wherein the interior space is configured to receive the slurry; and geo-fabric material positioned on a portion of said support frames, wherein said geo-fabric material is configured to filter the slurry received within the interior space, such that effluent water permeates through said geo-fabric material and is discharged from the interior space, wherein two adjacent support frames from said plurality of support frames present a gate assembly, wherein each of said support frames of said gate assembly include at least one wheel on a base of said support frame, wherein said wheels allow said support frames to rotate open to provide access to the interior space of said dewatering system.

14. The dewatering system of claim 13, wherein said support frames each include a base, an exterior side, and an interior side, and wherein said geo-fabric material is positioned on said interior side of said support frames.

15. The dewatering system of claim 14, wherein said interior side extends at an angle with respect to said base, wherein said angle is between 55 and 70 degrees.

16. The dewatering system of claim 13, further comprising a dump door assembly associated with at least one of said support frames, wherein said dump door assembly comprises a plurality of hatches configured to selectively open to allow effluent water to be discharged from the interior space of said dewatering system.

17. A method of dewatering a slurry dredged from a source of water, wherein the slurry is dewatered to form a solid material and effluent water, said method comprising the steps of:

(a) providing a dewatering system that includes a plurality of support frames arranged to enclose an interior space of the dewatering system, geo-fabric material positioned on a portion of the support frames, and a dump door assembly associated with at least one of the support frames, wherein the dump door assembly comprises a plurality of hatches;

(b) adding a slurry to the interior space of the dewatering system; and (c) separating the slurry into solid material and effluent water, wherein during the separating of step (c), the solid material settles to a bottom of the interior space of the dewatering system, and the effluent water is discharged from the dewatering system by being filtered through the geo-fabric material and by passing through an open hatch of the dump door assembly.

18. The method of claim 17, wherein the dewatering system is positioned at a site with an elevation higher than the source of water, such that the discharged effluent water can flow back to the source of water.

19. The method of claim 18, wherein the dewatering system further includes a portable skirting system that surrounds the plurality support frames and that extends to the source of water, such that the portable skirting system acts a synthetic flow channel for guiding the effluent water back to the source of water.

20. The method of claim 19, wherein the portable skirting system comprises a non-permeable plastic sheeting secured in position by a plurality of sandbags.

* * * * *